(12) United States Patent
Choi et al.

(10) Patent No.: US 11,983,048 B2
(45) Date of Patent: May 14, 2024

(54) INFORMATION HANDLING SYSTEM GLASS HOUSING HAVING AN INTEGRATED ANTENNA

(71) Applicant: Dell Products L.P., Round Rock, TX (US)

(72) Inventors: Duck-Soo Choi, Georgetown, TX (US); Peng Lip Goh, Singapore (SG); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 365 days.

(21) Appl. No.: 17/376,677

(22) Filed: Jul. 15, 2021

(65) Prior Publication Data

US 2023/0015184 A1    Jan. 19, 2023

(51) Int. Cl.
| | |
|---|---|
| G06F 1/16 | (2006.01) |
| H01Q 1/22 | (2006.01) |
| H01Q 1/44 | (2006.01) |
| H01Q 21/29 | (2006.01) |

(52) U.S. Cl.
CPC ......... *G06F 1/1698* (2013.01); *H01Q 1/2266* (2013.01); *H01Q 1/44* (2013.01); *H01Q 21/293* (2013.01)

(58) Field of Classification Search
CPC .......... G06F 1/1698; G06F 2200/1631; G06F 1/1601; G06F 1/1637; G06F 1/1656; H01Q 1/2266; H01Q 1/44; H01Q 21/293; H01Q 21/08; H01Q 21/28
See application file for complete search history.

(56) References Cited

U.S. PATENT DOCUMENTS

| | | | | |
|---|---|---|---|---|
| 11,537,170 | B2 * | 12/2022 | Hori ...................... | G06F 1/1656 |
| 11,588,223 | B2 * | 2/2023 | Mow ...................... | H01Q 19/30 |
| 11,646,501 | B2 * | 5/2023 | Wu ....................... | H01Q 21/065 |
| | | | | 343/702 |
| 11,811,133 | B2 * | 11/2023 | Edwards .............. | H01Q 3/2658 |
| 2020/0106158 | A1 * | 4/2020 | Gomez Angulo .... | G06F 1/1698 |

(Continued)

OTHER PUBLICATIONS

Laptop Mag, "HP Envy 14 Spectre Hands-on: First Glass Ultrabook," downloaded from https://www.laptopmag.com/articles/hp-envy-14-spectre-hands-on-first-glass-ultrabook-coming-february-8th-for-1399 on Jul. 15, 2021, 11 pages.

(Continued)

*Primary Examiner* — Rockshana D Chowdhury
(74) *Attorney, Agent, or Firm* — ZAGORIN CAVE LLP; Robert W. Holland

(57) ABSTRACT

A portable information handling system glass ceramic housing integrates plural wires on opposing sides that interface with a radio to provide a dipole antenna, such as with a radio conductor output interfaced at a wire of the interior side and a radio ground output interfaced at a wire of the exterior side. Conductive contacts interface with the wires by exposure at the glass ceramic housing interior where pogo pins of a printed circuit board assembly bias against the conductive contacts to communicate the radio signals. In one example embodiment, the conductive contacts co-locate with a logo etched into the glass ceramic housing to provide an aesthetically pleasing antenna interface that is difficult to visually detect at the glass ceramic housing exterior.

11 Claims, 22 Drawing Sheets

(56) References Cited

U.S. PATENT DOCUMENTS

| | | | | |
|---|---|---|---|---|
| 2020/0343624 A1* | 10/2020 | Yu | .................. | H01Q 21/065 |
| 2022/0278441 A1* | 9/2022 | Kodama | .................. | H01Q 9/26 |
| 2023/0291125 A1* | 9/2023 | Ayala Vazquez | ...... | H01Q 5/328 |

OTHER PUBLICATIONS

Nokia, "5G Gaming," downloaded from https://www.nokia.com/networks/5g/gaming/ on Feb. 15, 2021, 5 pages.

Telia Company, "5G for Esports Tested," downloaded from https://www.teliacompany.com/en/news/news-articles/2018/5g-speeds-for-esports-tested/ on Jul. 15, 2021, 3 pages.

Corning, "Glass is Better for Wireless Charging," downloaded from https://www.corning.com/gorillaglass/worldwide/en/glass-is-better-for-wireless-charging.html on Jul. 15, 2021, 3 pages.

Nokia, "Smart Node Femtocells," downloaded from https://www.nokia.com/networks/solutions/femtocells/ on Jul. 15, 2021, 4 pages.

Researchgate, "60 GHz dipole antenna for short range indoor communication systems," downloaded from https://www.researchgate.net/publication/261233540_60_GHz_dipole_antenna_for_short_range_indoor_communication_systems on Jul. 15, 2021, 2 pages.

Lenovo, "Laptop Docking Stations," downloaded from https://www.lenovo.com/us/en/accessories-and-monitors/ docking/dc/docking . . . on Jul. 15, 2021, 6 pages.

CNET, "HP Advanced Wireless Docking Station—wireless docking station—VGA, 2 x DP-802.11ad (WiGig) Specs & Prices," downloaded from https://www.cnet.com/products/hp-advanced-wireless-docking-station-wireless-docking-station-vga-2-x-dp/ on Jul. 15, 2021, 6 pages.

PNAS, "High thermal conductivity in soft elastomers with elongated liquid metal inclusions," downloaded from https://www.pnas.org/content/114/9/2143 on Jul. 15, 2021, 27 pages.

Arieca, "Modern Materials for a Connected Society," downloaded from arieca.com, 7 pages.

Figshare, "Stretchable Graphene Thermistor with Tunable Thermal Index," downloaded from https://figshare.com/articles/journal_contribution/Stretchable_Graphene_Thermistor_with_Tunable_Thermal_Index/2193646 on Jul. 15, 2021, 7 pages.

Semantic Scholar, "Stretchable Graphene Thermistor with Tunable Thermal Index," downloaded from https://www.semanticscholar.org/paper/Stretchable-graphene-thermistor-with-tunable-index.-Yan-Wang/1d03bb564b4713a2b69a42f31a0ae6f1d5cf2bff on Jul. 15, 2021, 4 pages.

The Verge, The Lg G8 has a vibrating OLED screen for a speaker, downloaded from https://www.theverge.com/2019/2/13/18224394/lg-g8-thinq-oled-speaker-quad-dac-boombox on Jul. 15, 2021, 2 pages.

* cited by examiner

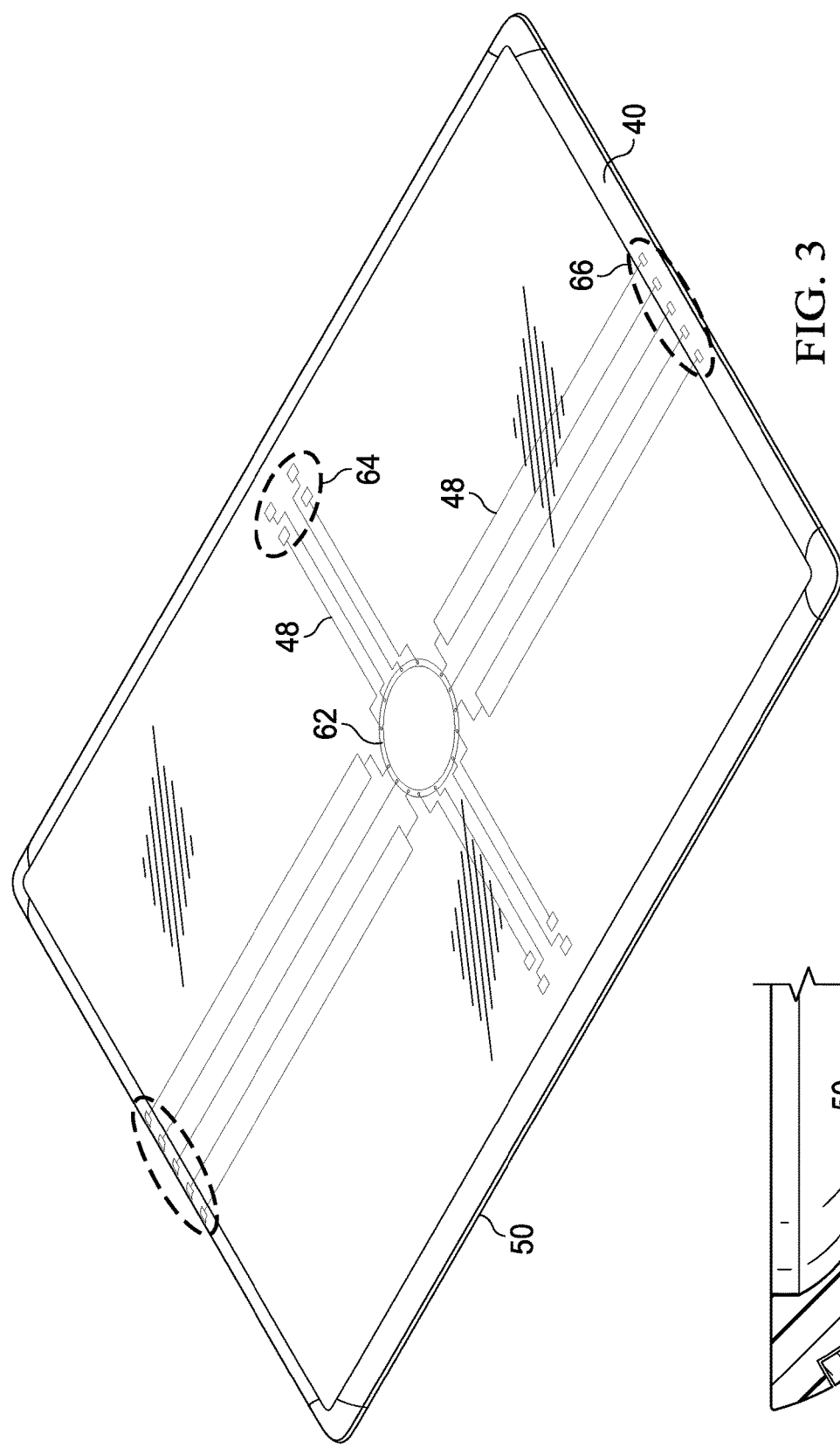

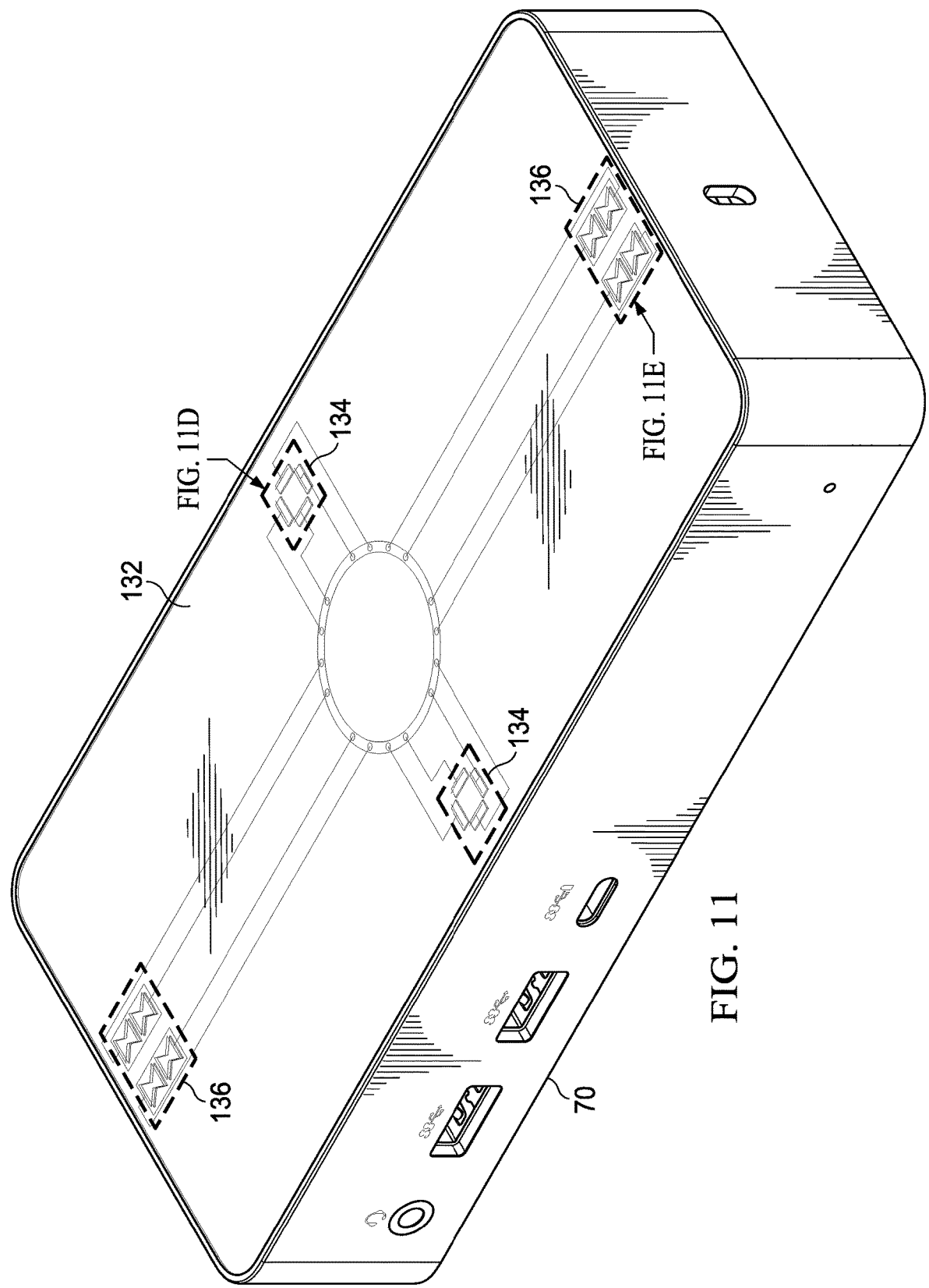

INFORMATION HANDLING SYSTEM GLASS HOUSING HAVING AN INTEGRATED ANTENNA

BACKGROUND OF THE INVENTION

Field of the Invention

The present invention relates in general to the field of portable information handling systems, and more particularly to an information handling system glass housing having an integrated antenna.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Generally, end users prefer portable information handling systems with a minimal footprint and weight, which has driven manufacturers to provide a given processing capability in as minimalist of a housing as possible. Typically, an end user selects a display size, which drives the housing width and length, and then selects a particular information handling that meets a desired performance level and housing thickness, also known as Z-height. Generally, as housing thickness decreases thermal constraints limit processing component performance due to less efficient rejection of excess thermal energy. Reduced housing thickness also increases the difficulty of including high performance components due to the reduced housing interior. For example, portable information handling systems often include a variety of wireless devices and antennae; where housing size is minimal, less room is available to deploy the antennae, which can increase wireless interference and hurt wireless signal transmission and reception. As another example, portable information handling systems are often used to present multimedia information, such as movies and music; where housing size is minimal, insufficient room exists to integrate a high quality speaker, particularly in lower audio tones that tend to need larger speaker volumes for high quality sound.

Another difficulty with low profile portable information handling systems is that thinner housings tend to be less robust and more susceptible to failure. Typically, portable housings are tested by repeated cycles of usage, such as repeated opening and closing of housing portions. To reduce housing thickness and weight, some manufacturers have moved towards more exotic materials, such as ceramics. One example of a material that offers aesthetically-pleasing and robust qualities is a glass ceramic material. Glass ceramic material has gained acceptance as a hardened clear cover placed over a display, especially in portable tablet and phone devices that are susceptible to dropping and breaking. One commercial product is Gorilla Glass by Corning, which provides a hardened transparent material that resists breakage. Glass ceramics offer advantages as a housing material in addition to use as a glass cover, although glass ceramics do not conduct or current heat very readily, which can introduce difficulties with thermal management, wireless signal management and other system functions.

SUMMARY OF THE INVENTION

Therefore, a need has arisen for a system and method which integrates an antenna with an information handling system glass housing.

A further need exists for efficient antenna radiation pattern management with a director integrated in the information handling system glass housing.

In accordance with the present invention, a system and method are provided which substantially reduce the disadvantages and problems associated with previous methods and systems for integrating an antenna coil into an information handling system housing. Antenna, ground and director wires integrated in a glass housing and interface with a radio at the interior of the glass housing to communicate through wireless radio signals with external radios, such as in support of WLAN, WWAN, WPAN and 5G-type networks. Conductive material exposed at the glass housing interior surface interfaces the antenna and ground with the radio disposed in the housing interior, such as with pogo pins of a printed circuit board assembly. In one example embodiment, director wires integrated in the glass housing manage directional control of antenna signals.

More specifically, a portable information handling system processes information with processing components disposed in portable housing, such as a processor and memory. In one example embodiment, a main housing is formed from a planar glass ceramic piece and a plastic case coupled to the glass ceramic interior side. In an alternative embodiment a housing lid is formed with a glass ceramic assembly of plural pieces, such as coupled together with an optically clear adhesive. Antenna, ground and director wires integrate in the glass ceramic material with the antenna exposed at an interior side to interface with a radio, such as with pogo pins that bias against the glass ceramic housing at exposed conductive contacts. A printed circuit board assembly aligns the pogo pins with the conductive contacts through bosses formed in the plastic case and communicates radio information transmitted and received at the antenna to a radio of the information handling system, such as a WNIC that supports WWAN, WLAN, WPAN and/or 5G protocols. In one example embodiment, the antenna interface traces and conductive contacts co-locate with a logo to blend into the housing.

The present invention provides a number of important technical advantages. One example of an important technical advantage is that a glass ceramic housing integrates antenna, ground and/or director wires in a low profile configuration with an aesthetically pleasing appearance. A printed circuit board assembly having pogo pins aligned with conductive contacts of the glass ceramic housing provide a reliable interface for communicating radio information between a radio disposed in the housing and an antenna integrated with the housing. The glass ceramic material helps to maintain strong antenna performance with good thermal characteristics and has a large footprint to achieve efficient antenna dispositions for communication of different types of wireless signals.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 3 and 3A depict a lower perspective view of the glass ceramic housing of an example embodiment having antenna wires configured to interface with a radio to blend into a DELL logo;

FIGS. 11, 11A, 11B, 11C, 11D and 11E depict an example of an information handling system docking station having a glass ceramic housing cover that integrates antennas;

DETAILED DESCRIPTION

A portable information handling system housing of a glass ceramic material integrates wireless antenna, ground and/or director elements that communicates wireless signals associated with a radio disposed in the housing interior. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
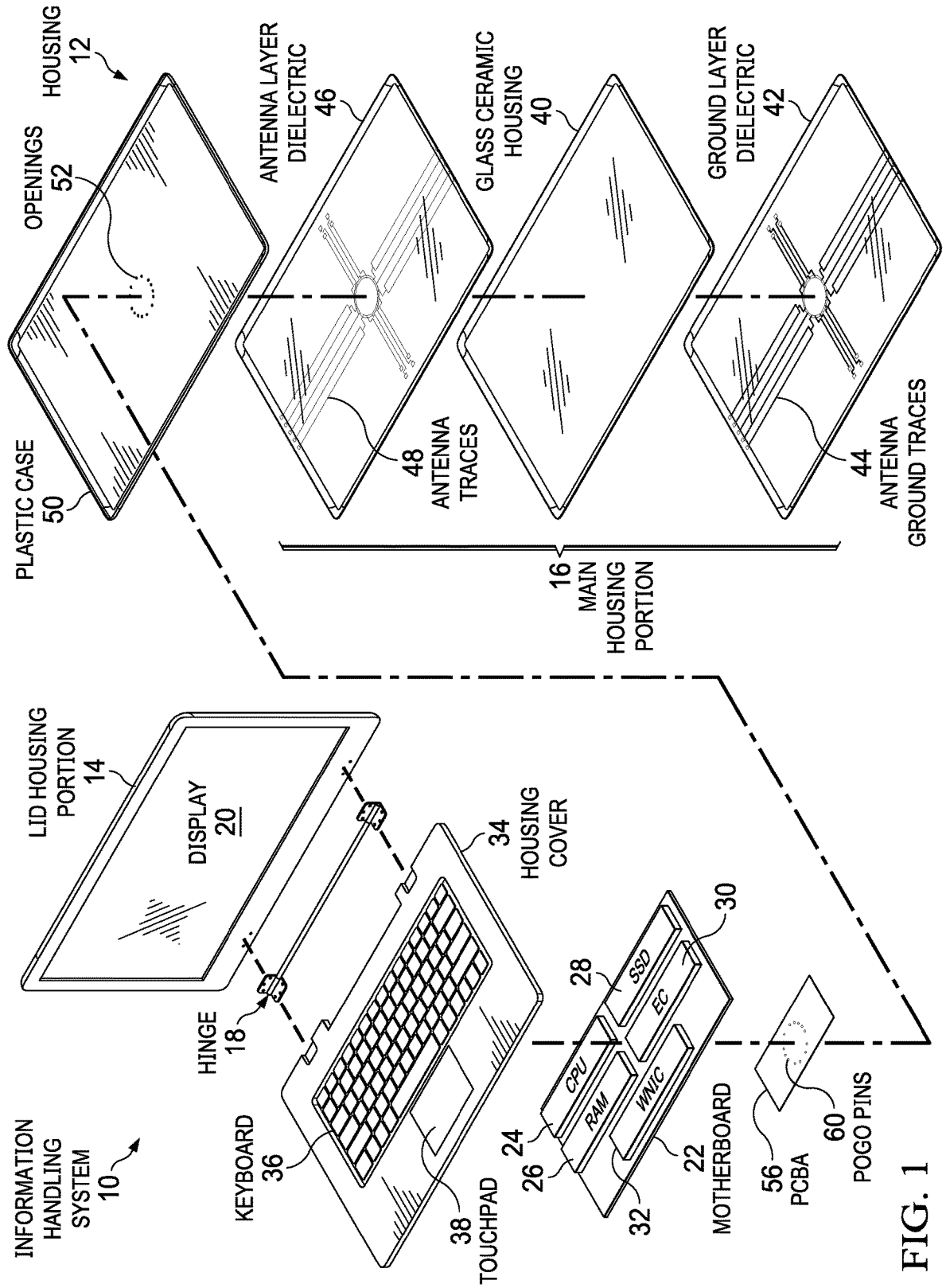
FIG. 1 depicts an exploded perspective view of a portable information handling system having a radio antenna integrated in a glass ceramic housing.

Referring now to FIG. 1, an exploded perspective view depicts a portable information handling system 10 having a radio antenna integrated in a glass ceramic housing 40. In the example embodiment, information handling system 10 is built in a housing 12 having a main housing portion 16 rotationally coupled to a lid housing portion 14 by a hinge 18 to have a convertible configuration that translates between closed and open positions. Alternative embodiments may include tablet information handling systems having a planar housing or other types of housing arrangements. Main housing portion 16 houses processing components that cooperate to process information. For instance, a motherboard 22 coupled to main housing portion 16 interfaces a central processing unit (CPU) 24 that executes instructions to process information with a random access memory (RAM) 26 that stores the instructions and information. A solid state drive (SSD) 28 or other persistent storage device stores the information and instructions during power down periods, such as an operating system and applications that execute on CPU 24 to generate information. An embedded controller 30 interfaces with CPU 24 to manage system operations, such as power application and thermal constraints, and to coordinate interactions with input devices. A wireless network interface card (WNIC) 32 is a radio interfaced with embedded controller 30 and CPU 24 to support wireless communication by transmitting and receiving wireless signal, such as wireless local area network (WLAN) signals in the 2.4 GHz and/or 5 GHz bands, wireless personal area network (WPAN) signals in the 2.4 GHz and 60 GHz bands, and/or wireless wide area network (WWAN) signals in mobile telephone bands. A housing cover 34 couples over main housing portion 16 to support a keyboard 36 and touchpad 38 that accept end user inputs for communication with embedded controller 30. A display 20 integrates in lid housing portion 14 to present visual information as visual images, such as after a graphics processor further processes information of CPU 24 to define pixel values.

In the example embodiment, main housing portion 16 integrates a wireless antenna capability that transmits and receives wireless signals for a radio integrated in housing 12 to an external radio, such as a WLAN radio, a peripheral device radio supporting Bluetooth or 60 GHz, and/or a WWAN radio. A planar glass ceramic housing 40 is formed from a glass ceramic material, such as Gorilla glass by Corning. Glass ceramic material provides a hardened transparent glass with a polycrystalline structure produced by controlled crystallization of base glass to adapt properties of both glass and ceramic. In alternative embodiments, other housing materials may be used to include ceramic materials and glass materials more generally defined to include common glass. Generally, to provide wireless communication capabilities a dielectric housing material is desirable and glass ceramic has been shown to support wireless signal transfer effectively, as is explained in the article: https://www.corning.com/gorillaglass/worldwide/en/glass-is-better-for-wireless-charging.html. In the example embodiment, integrating antenna traces 48 in an antenna layer dielectric 46 that couples to the interior side of glass ceramic housing 40 allows antenna traces 48 to be hidden from view from external to the system while wirelessly communicating signals passing through the glass ceramic material of glass ceramic housing 40. To further support effective wireless signal communication, antenna ground traces 44 are integrated in glass ceramic housing 40 with a ground layer dielectric 42 that couples to an exterior side of glass ceramic housing 40 to have a position relative to antenna traces 48 to provide a desired antenna pattern. As is described in greater depth below, through glass via (TGV) openings formed in glass ceramic housing 40 filled with conductive material, such as copper, communicate current between ground traces 44, conductive contacts at the housing interior and the system radio. In an alternative embodiment, antenna traces 48 may be located at the housing exterior and interface with the radio through conductive material disposed in a TGV opening. A plastic case 50 having pogo pin openings 52 couples to the inner surface of glass ceramic housing 40 and provides a coupling material to which printed circuit board assembly 56 couples. Pogo pins 60 of printed circuit board assembly 56 insert into pogo pin openings 52 aligned with conductive contacts exposed at the interior surface of glass ceramic housing 40. In this manner, printed circuit board assembly 56 interfaces wireless signals received and transmitted at antenna traces 48 with WNIC 32. In one alternative embodiment, WNIC 32 may be located on printed circuit board assembly 56.

Although the example embodiment provides antenna and ground traces in separate layers of glass ceramic housing 40, as is described in greater depth below, a variety of antenna and ground configurations may be leverage to provide an optimal antenna performance that takes advantage of the surface area offered by the glass ceramic housing. For instance, a dipole antenna may have a transmitter interfaced with an antenna trace 48 at the housing interior side and a ground interfaced with an antenna ground trace 44 at the housing exterior side. Alternatively, both the antenna and ground traces may be in the same dielectric. The example embodiment places the antenna in the main housing, however, the antenna and ground traces may instead integrate lid housing portion 14 behind display 20 so that the antenna has a more clear transmission path. In another example, antenna and ground traces may be distributed between lid and main housing portions, such as with a dipole transmitter integrated in the lid housing portion and the dipole ground integrated in the main housing portion. The large surface area of the glass ceramic housing supports a variety of other antenna configurations, such as MIMO and patch type antennas. Although the example embodiment uses a dielectric to integrate traces with a photolithography process that then couples to the glass ceramic housing, such as with an optically clear adhesive, alternative embodiments may directly integrate the conductive traces into the glass ceramic housing.

Figure 2:
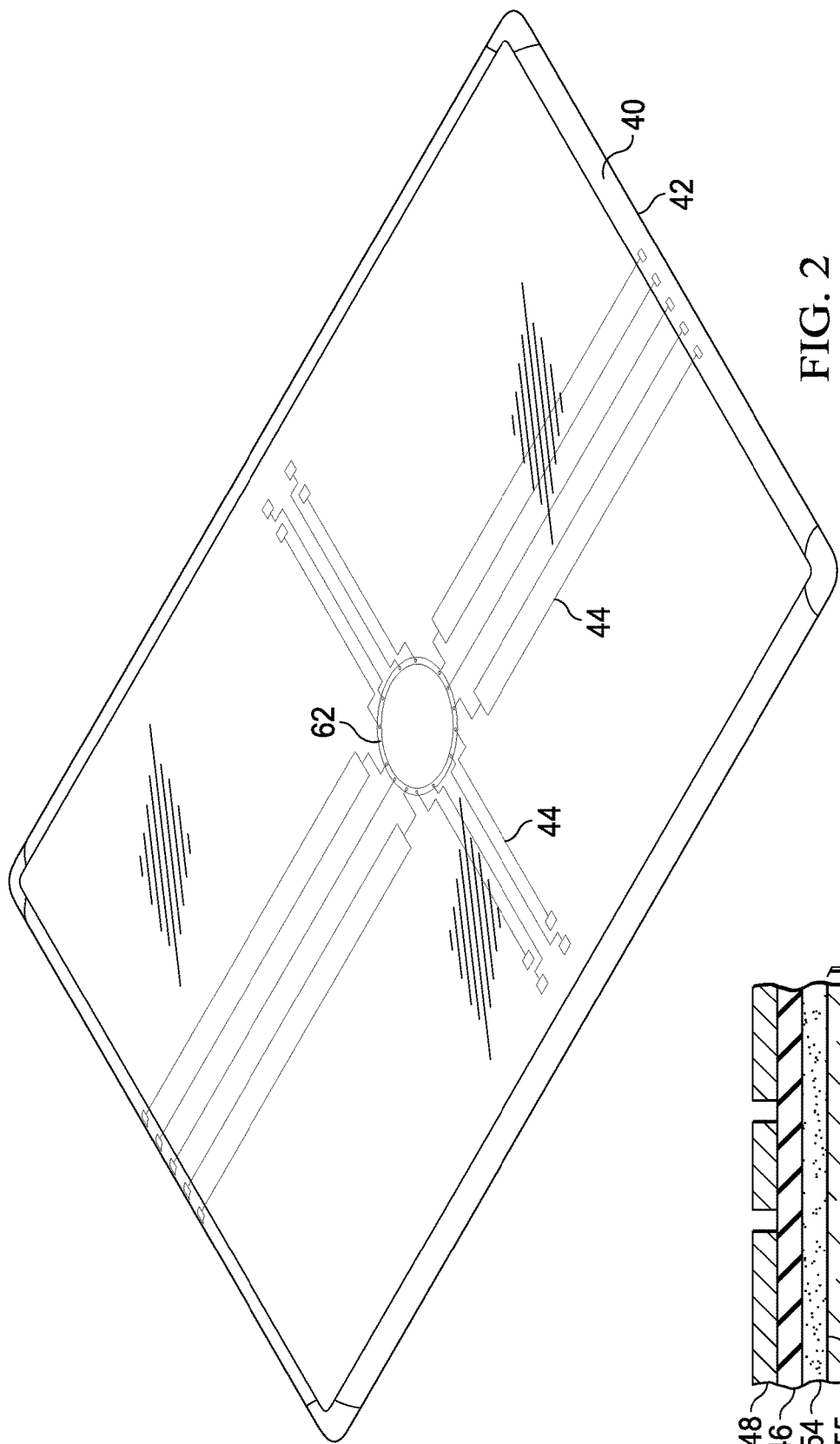
FIGS. 2 and 2A depict a bottom view of the main housing portion illustrating one example of antenna and ground traces integrated in inner and outer surfaces of a glass ceramic housing.
Figure 2A:
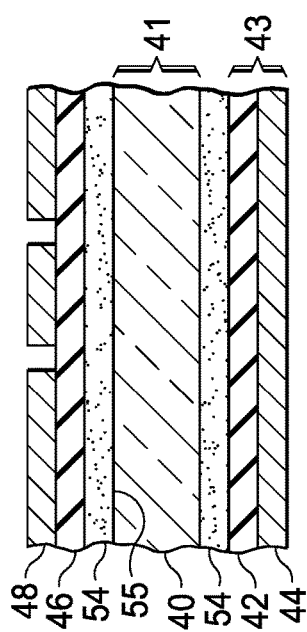
Figure 4:
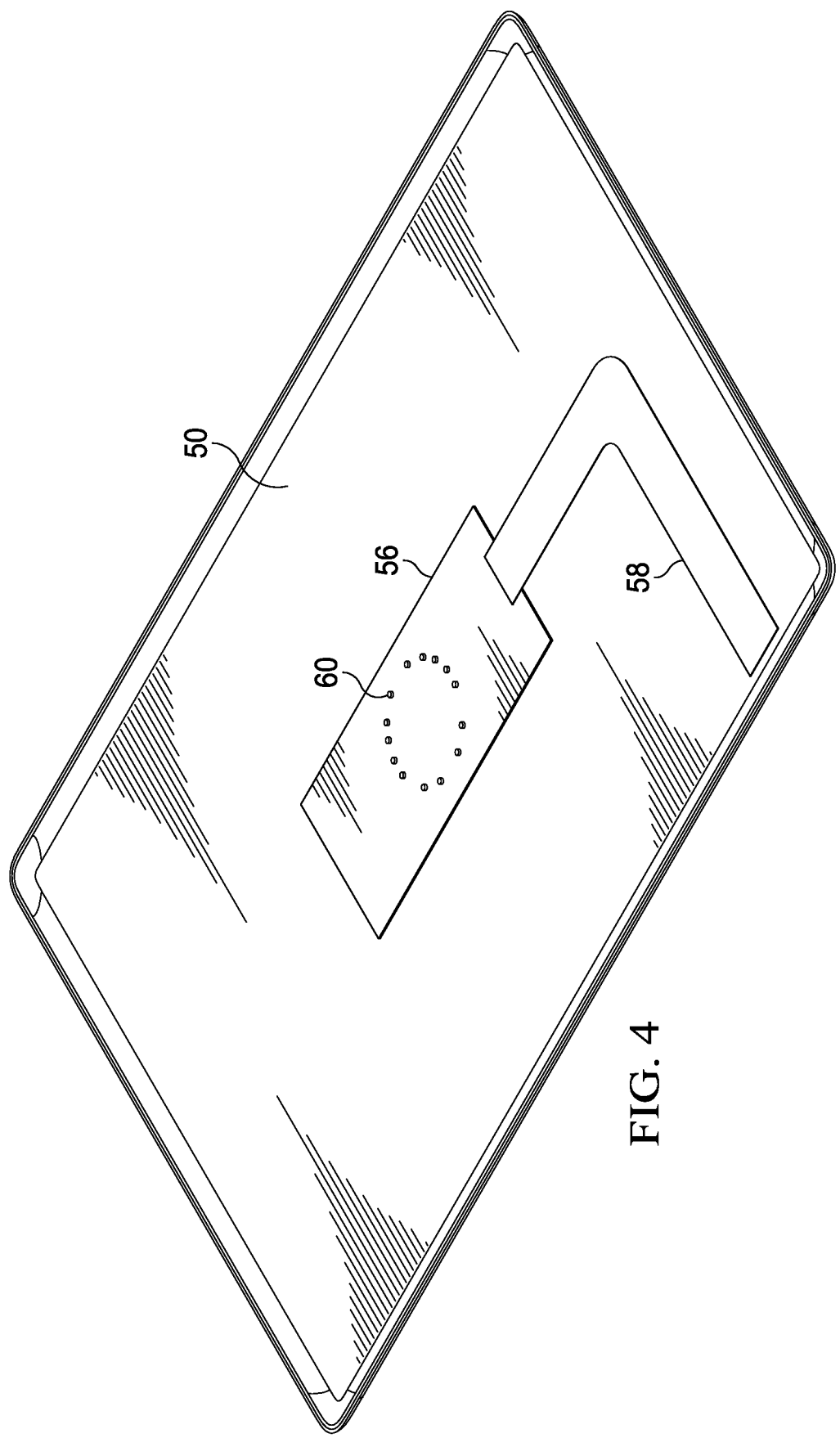
FIGS. 4, 4A, 4B, 4C and 4D depict an upper perspective and sectional view of an example of a plastic case that couples to the interior side of the glass ceramic housing to accept the printed circuit board assembly.

Referring now to FIGS. 2 and 2A, a bottom view of main housing portion 16 illustrates one example of antenna and ground traces integrated in inner and outer surfaces of a glass ceramic housing 40. FIG. 2 depicts a bottom perspective view of main housing portion 16 having antenna ground layer dielectric 42 with integrated ground traces 44 coupled to the exterior side of glass ceramic housing 40, such as with a liquid optically clear adhesive. Ground traces 44 blend in with a logo 62 showing DELL associated with products sold by DELL INC. As depicted in FIGS. 3 and 4, the etching of logo 62 provides an area in which an interface may be established of the ground traces and the radio that is blended with the etching to hide from an end user. FIG. 2A depicts a sectional side view of glass ceramic housing 40 having antenna ground traces 44 integrated in a transparent ground layer dielectric 46 that couples to glass ceramic housing 40 at the housing exterior with an optically clear adhesive 54. Antenna traces 48 integrate in a transparent antenna layer dielectric 46 and couple at glass ceramic housing 40 exterior with optically clear adhesive 54. In the example embodiment, a silk screen layer 55 or other opaque treatment disrupts viewing of antenna and ground wires from external to glass ceramic housing 40. A through glass via (TGV) 41 filled with conductive material 43, such as through a redistribution process, provides a conductive path from antenna ground traces 44 upwards to a contact exposed at the housing interior where a radio ground interface may be established. As an example, a silver alloy is used to form wires with the antenna and ground traces with a photolithography process, and through glass via openings are created in glass ceramic material to accept copper or other conductive material. In photolithography, a silver alloy trace of 0.2 micrometers is first etched on a glass, which is then deposited on a 40 micrometer thick transparent dielectric to create a semi-invisible film. A 100 micrometer thick optically clear adhesive is applied to the glass ceramic and the silver alloy traces are interfaced to the conductive material in the through glass via openings with a redistribution layer (RDL) process to deposit copper to complete the circuits that define antenna and ground wires. In one alternative embodiment, some or all of the wire traces may be etched or deposited directly to the glass ceramic material. In the example embodiment, the result is a set of antenna wires on an interior side of glass ceramic housing 40 that are exposed for contact with a radio interface and a set of ground wires on the exterior side of glass ceramic housing 40 that interface to the radio through conductive material integrated in the TGV openings. Alternatively, ground traces may interface with a common ground through a side surface of the housing to avoid the use of TGV openings. In the example embodiment, a central location at logo 62 is used to exposed conductive contacts formed at the interior side of glass ceramic housing 40 to interface with pogo pins of the printed circuit board assembly.

Referring now to FIGS. 3 and 3A, a lower perspective view of the glass ceramic housing 40 depicts an example embodiment having antenna wires configured to interface with a radio to blend into a DELL logo 62. In the example, antenna traces 48 are visible but located at an interior surface against plastic case 50. Antenna traces 48 run through the DELL logo 62 to interface each of the antenna wires with a central location of the glass ceramic housing 40 where the pogo pins make contact on the housing interior side. As stated above, if an opaque treatment is applied before application of the antenna layer dielectric, antenna traces 48 may appear substantially invisible while an etched glass DELL logo and ground traces provide a decorative appearance. FIG. 3A depicts a side sectional view of plastic case 50 coupled to glass ceramic housing 40 with a liquid optically clear adhesive 54 so that antenna traces 48 are captured at the housing interior. In alternative embodiments, other types of case materials and adhesives may be used that do not interfere with radio wireless signal transmission and reception. In the example embodiment, antenna traces 48 communicate wireless signals to a set of front face antenna 64 located at the front and rear of glass ceramic housing 40 and to a set of edge antenna 66 on opposing side edges of ceramic housing 40. The antenna and ground traces correspond to generate a desired direction radio signal from patch antennas defining a dipole and formed with wire traces integrated in glass ceramic housing 40 at both front face antenna 64 and edge antenna 66.

Figure 4A:
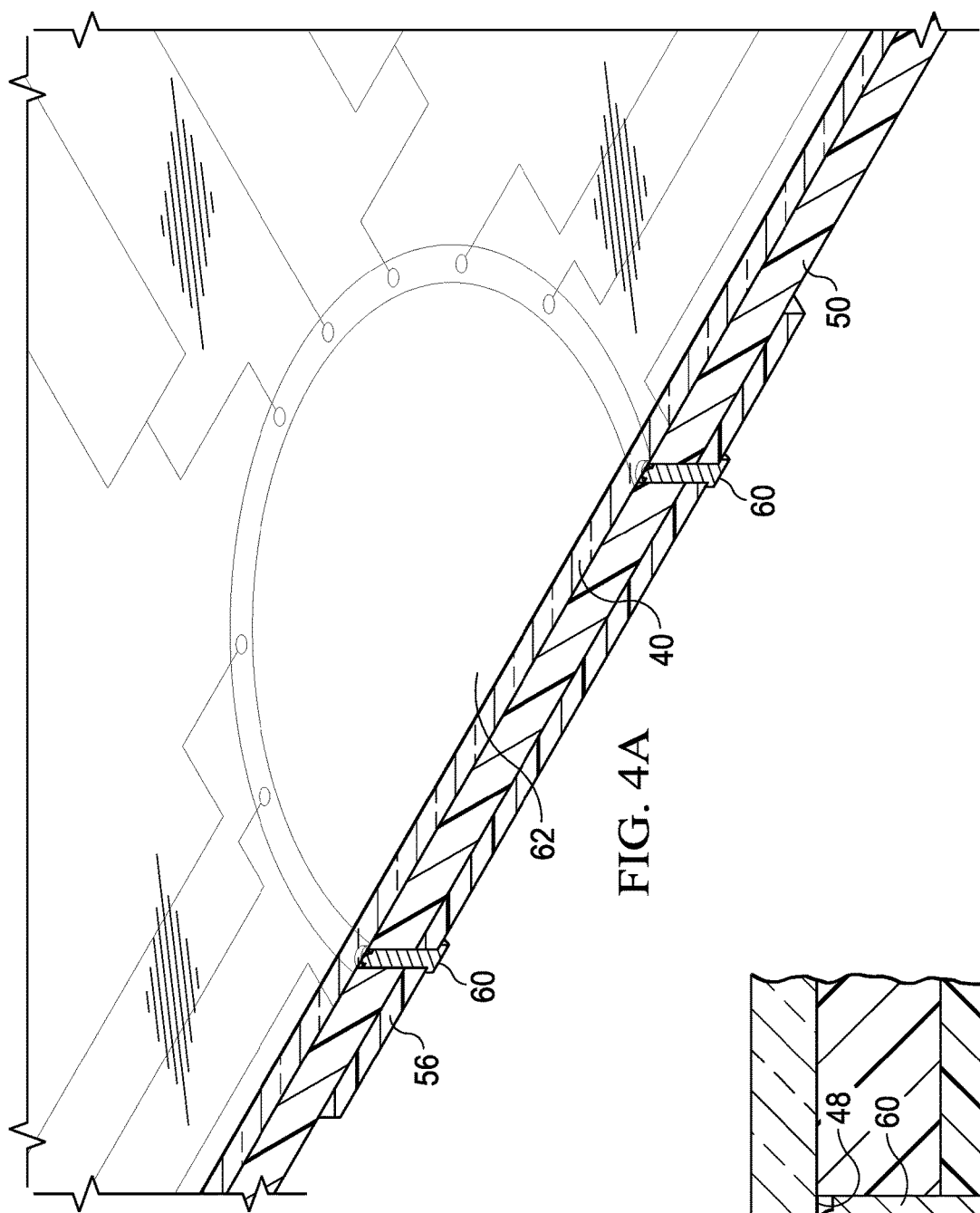
Figure 4B:
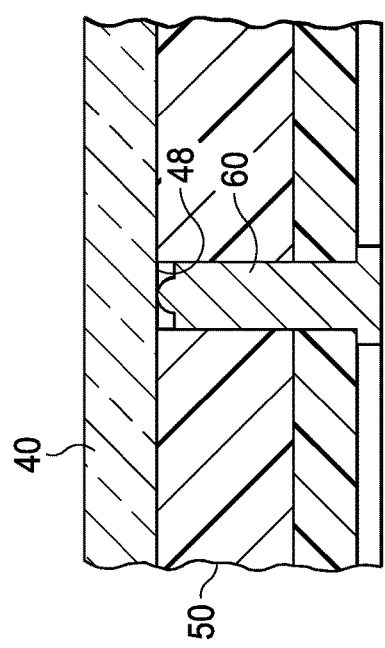
Figure 4C:
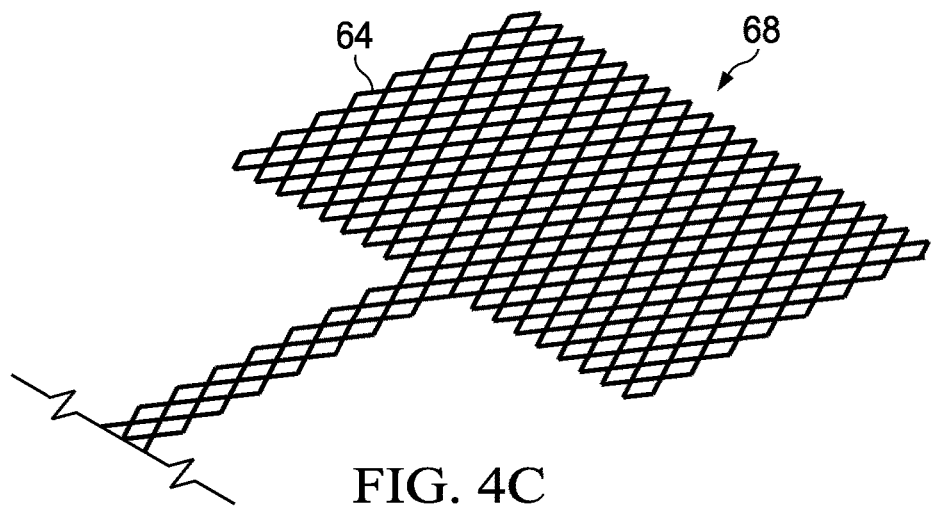
Figure 4D:
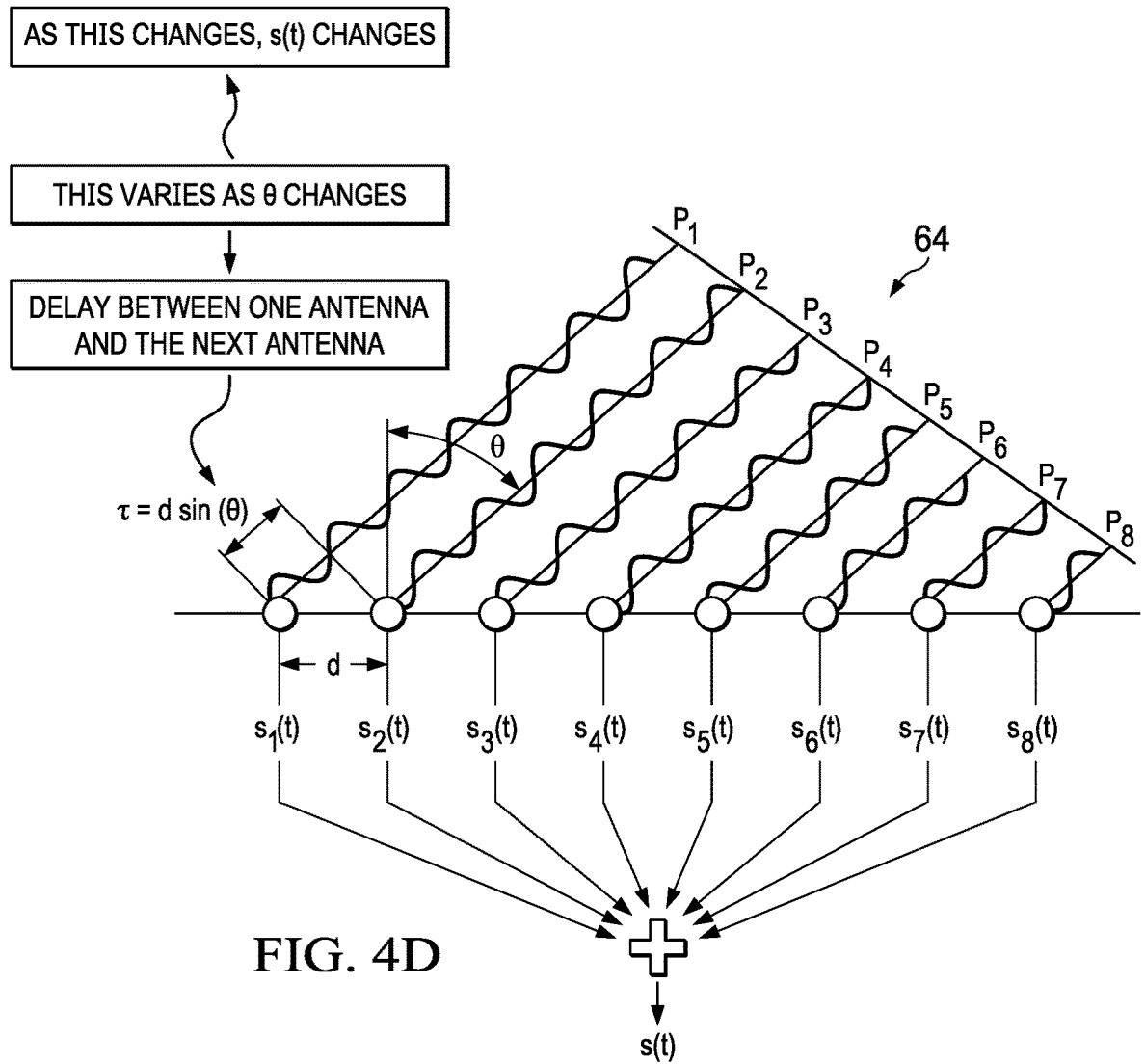
Figure 5:
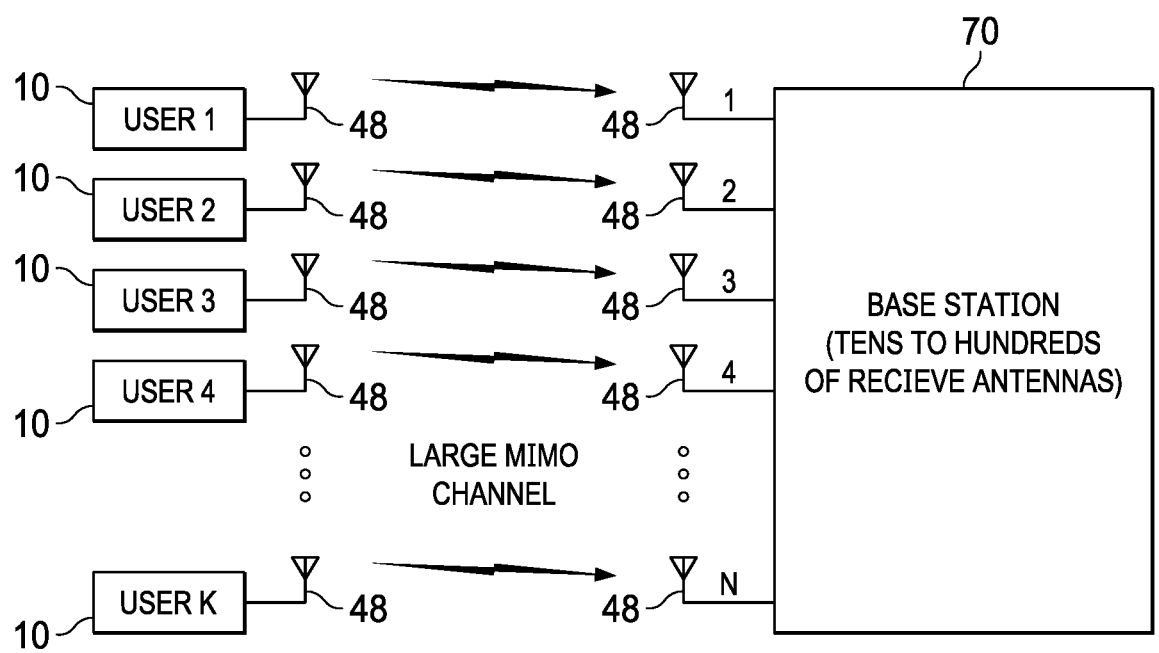
FIG. 5 depicts an example embodiment of a base station, such as a wireless access point or a docking station, which communicates with wireless signals to plural information handling systems through integrated antenna traces.

Referring now to FIGS. 4, 4A, 4B, 4C and 4D, an upper perspective and sectional view depicts an example of a plastic case 50 that couples to the interior side of the glass ceramic housing 40 to accept the printed circuit board assembly 56. Plastic case 50 conforms to the shape of the interior of glass ceramic housing 40 and includes openings that pass through pogo pins 60 to contact the conductive contacts of antenna traces and ground traces at the conductive material integrated in TGV openings. FIG. 5 depicts PCBA 56 coupled to plastic case 50 with a flexible printed circuit 58 that interfaces PCBA 56 to a radio. In an alternative embodiment, the radio may be integrated in PCBA 56 so that flexible printed circuit 58 communications power and information from a motherboard that the radio applies at PCBA 56 to communicate through the integrated antenna. FIG. 4A depicts that openings formed in plastic case 50 guides the printed circuit board assembly pogo pins 60 to correct alignment with antenna and ground contacts. FIG. 4B depicts a side sectional view having pogo pin 60 of PCBA 56 passing through an opening of plastic case 50 to press directly against antenna trace 48 integrated in glass ceramic housing 40. In alternative embodiments, additional conductive material may be disposed at the location of the conductive contact, such as with a square or circle at the termination of an antenna wire or a copper contact exposed at the housing interior that extends to the ground wire integrated in the housing exterior. FIG. 4C depicts a close up view of front face antenna 64 illustrating a mesh of a diamond grid 68 that forms the patch antenna on the edge of the housing. FIG. 4D illustrates how the diamond grid provides directional control of radio signals. The configuration of the wires of the diamond grid may be adjusted based upon the frequency of the radio signal being transmitted. By deploying plural antenna mesh diamond grids 68 at the housing edge, improved radio coverage may be achieved.

Figure 6:
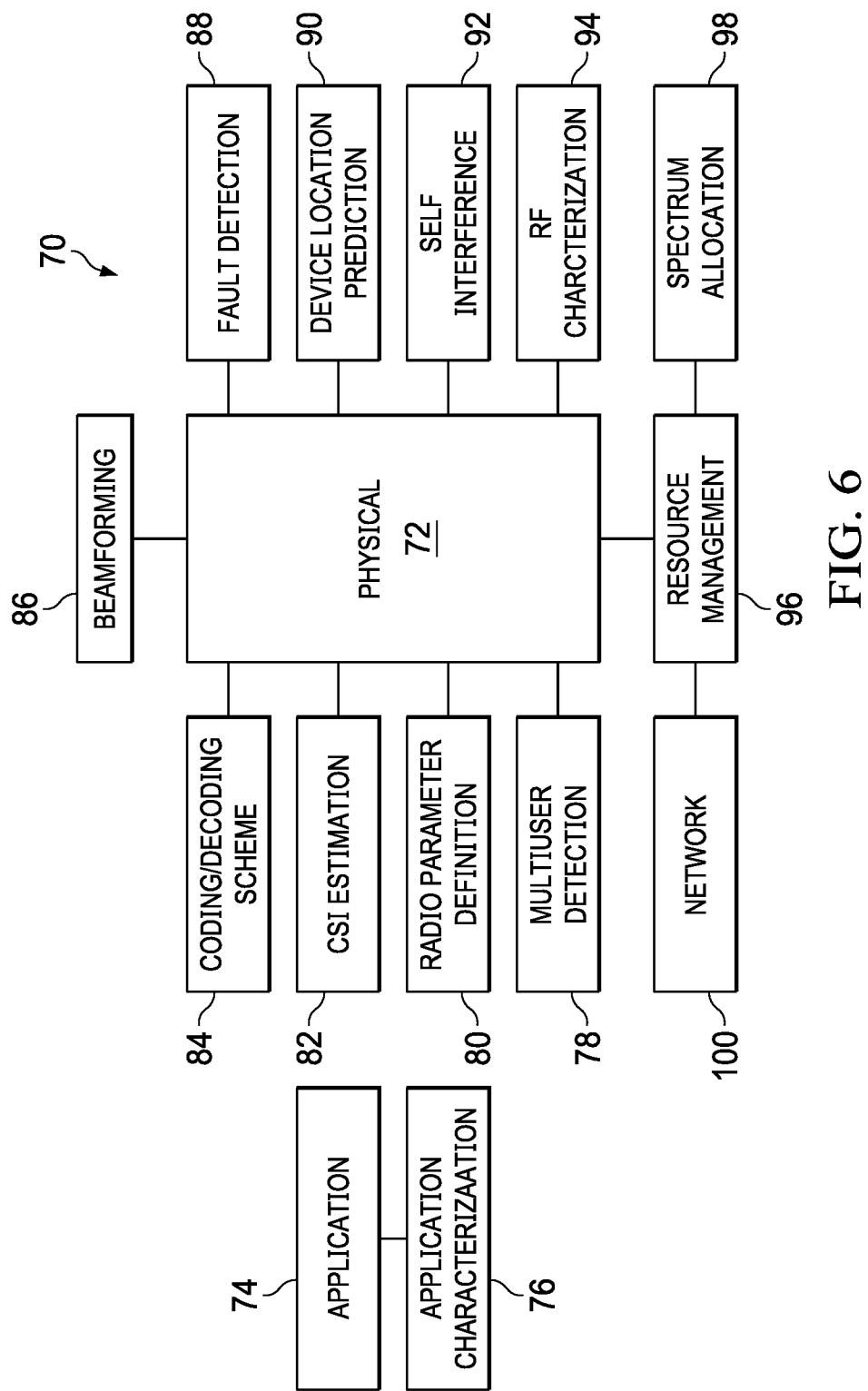
FIG. 6 depicts an example of radio communication control provided with a MIMO configuration of antenna at base station, although the same elements may be used in each information handling system.

Referring now to FIG. 5, an example embodiment depicts a base station 70, such as a 5G femtocell, a wireless access point or a docking station, which communicates with wireless signals to plural information handling systems 10 through antenna traces 48. Advantageously, disposing antenna traces at different locations across the surface of a glass ceramic housing provides enhanced performance with reduced interference and directional control, such as by placing the antenna in a MIMO configuration. FIG. 6 depicts an example of radio communication control provided with a MIMO configuration of antenna at base station 70, although the same elements may be used in each information handling system 10. Physical hardware elements 72 may include plural radios, processing devices and non-transitory memory that stores instructions to perform the functions described herein, such as executing applications 74 with application characterizations 76. A multi-user detection module 78 detects the presence of multiple users interfaced through the radios. A radio parameter definition 80 stores parameter definitions applied by the radios to coordinate communication with multiple external radios, such radio channels, external radio direction and time domain communication channels. CSI estimation module 82 performs channel estimation for radios communicating in the network. Coding/decoding scheme module 84 defines the CODEC or algorithm that codes and decodes radio signals captured through the antenna. A beamforming module 86 adjusts transmitted radio signals to form beams that direct the radio signal in a desired direction, such as towards a target radio. Beamforming may be performed based upon the communication of the wireless signals across different patch antennas. A fault detection module 88 monitors decoded signals to detect faults, such as with correction information added to radio packets. A device location prediction module 90 analyzes radio signals to map device positions for directional radio communication. A self-interference module 92 calculates radio operations to achieve directional control. An RF characteristics module 94 defines the radio signal characteristics applied by the radio to communication the radio signals. The physical hardware elements 72 interface with external devices through a resource management module 96, such as a physical network 100 or a wireless network defined by a frequency spectrum allocation 98. The example modules depicted by FIG. 6 may include firmware instructions stored in flash memory and organized in other logical groups to support WWAN, WLAN and WPAN wireless communications.

Figure 7:
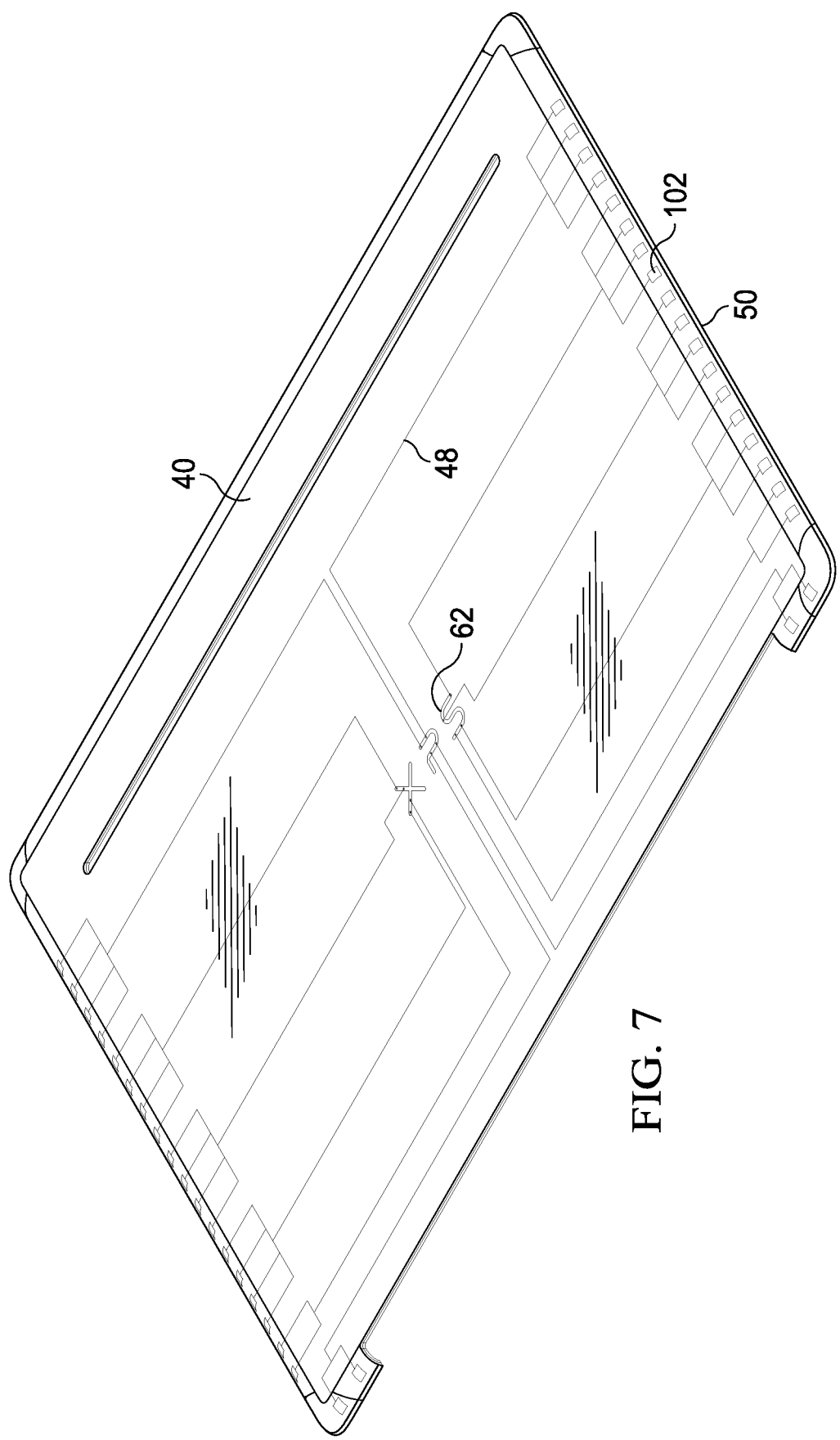
FIGS. 7 and 7A depict an alternative example of integrated antenna traces having a plurality of patch edge antennas.
Figure 7A:
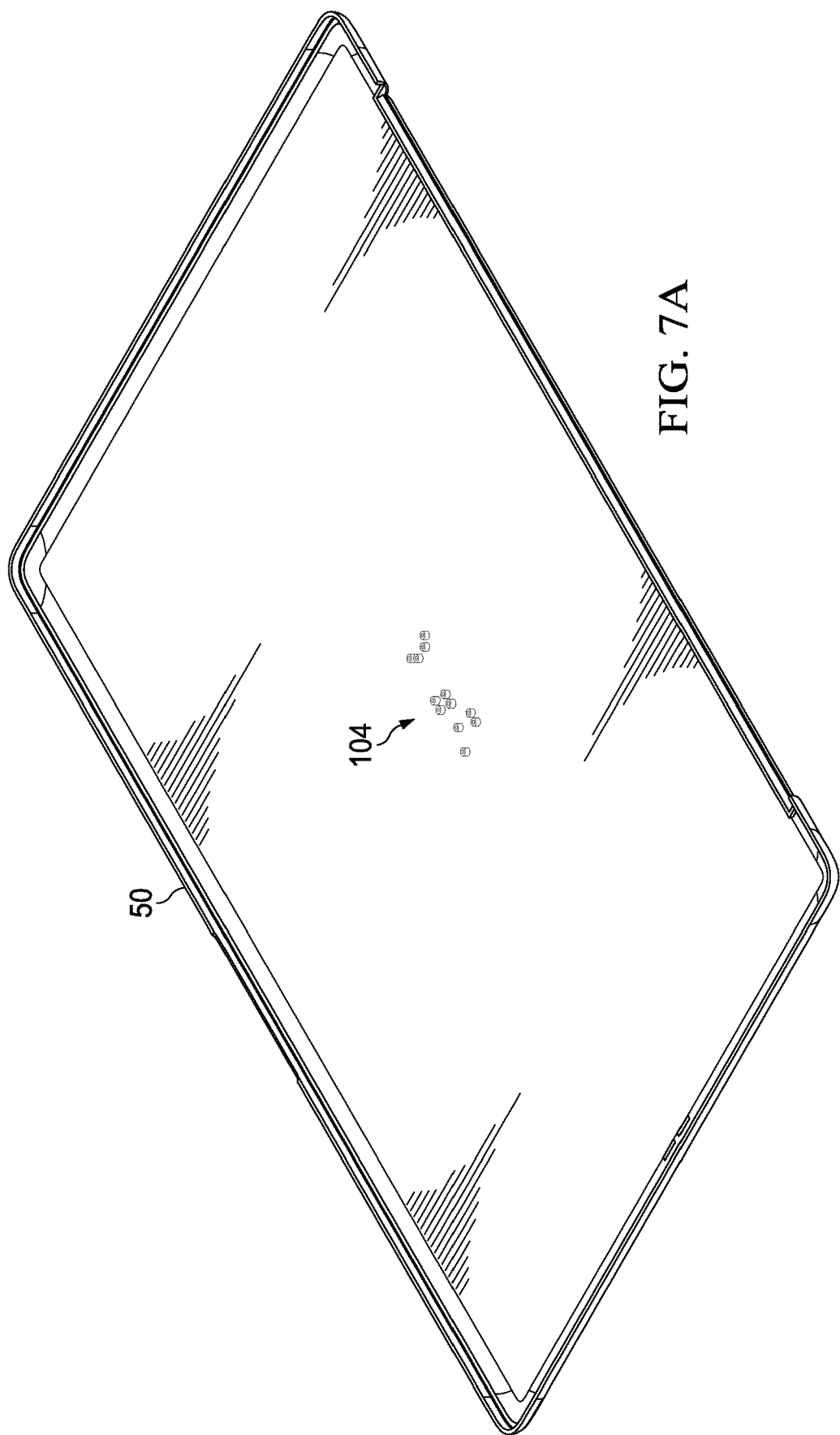

Referring now to FIGS. 7 and 7A, an alternative example of integrated antenna traces depicts a plurality of patch edge antennas 102. In the example embodiment, logo 62 has XPS etched into a central location to identify a brand of DELL Inc. The letters provide a central location from which antenna traces 48 define wires integrated in glass ceramic housing 40 to communicate with each of patch edge antennas 102. Patch edge antennas 102 are, for example, diamond mesh configurations that provide directional support. FIG. 7A illustrates bosses 104 that extend up from plastic case 50 to help align the PBCA to couple in place with pogo pins contacting exposed traces. The patch edge antenna configuration supports, for example, MIMO coordination for directional communication with external radios.

Figure 8:
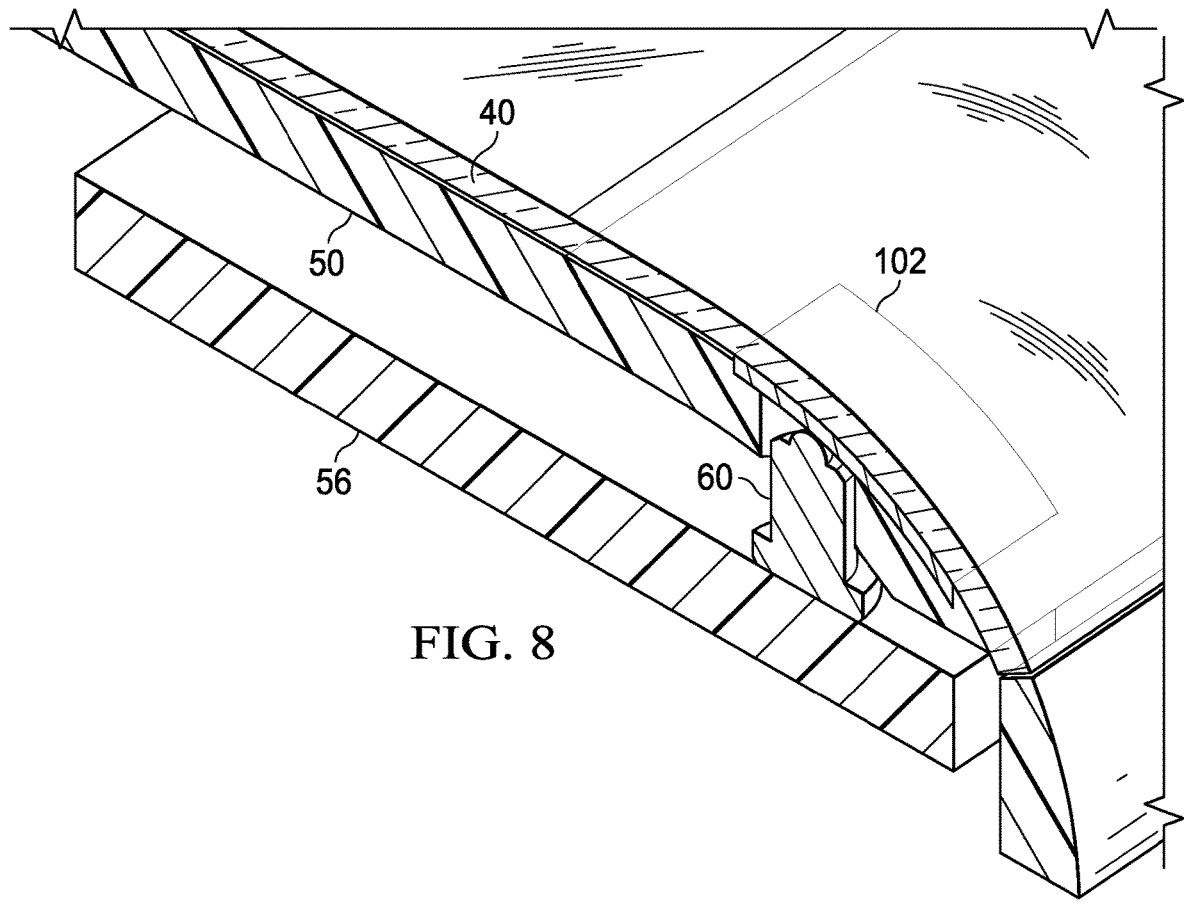
FIGS. 8 and 8A depict another example embodiment of an alternative configuration of patch antennas to communicate wireless information.
Figure 8A:
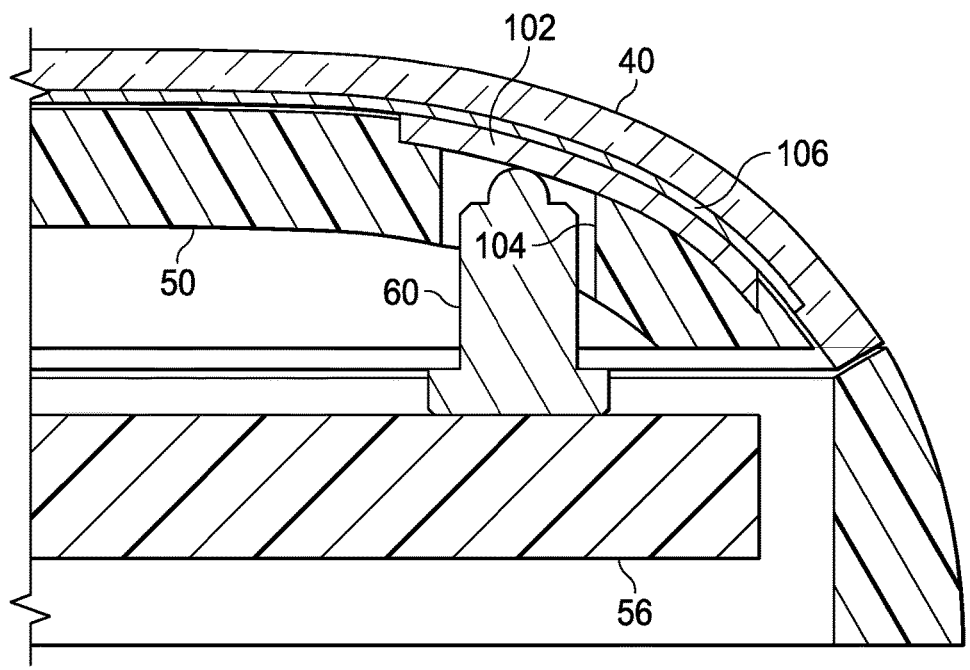

Referring now to FIGS. 8 and 8A, another example embodiment depicts an alternative configuration of patch antennas 102 to communicate wireless information. In the example embodiment, patch antenna 102 are flexible printed antenna or metal stamped antenna exposed at the bottom surface of glass ceramic housing 40 at a curved edge surface. PCBA 56 extends upwards a pogo pin 60 that biases directly against the conductive material of the patch antenna 102. FIG. 8A depicts a side sectional view of the pogo pin 60 in contact with patch antenna 102 to communicate wireless signals and guided through a boss 104 formed in plastic case 50 to aid in alignment. A silk screen or other opaque treatment 106 disposed at the bottom surface of glass ceramic housing 40 conceals the antenna from view to an external user.

Figure 9:
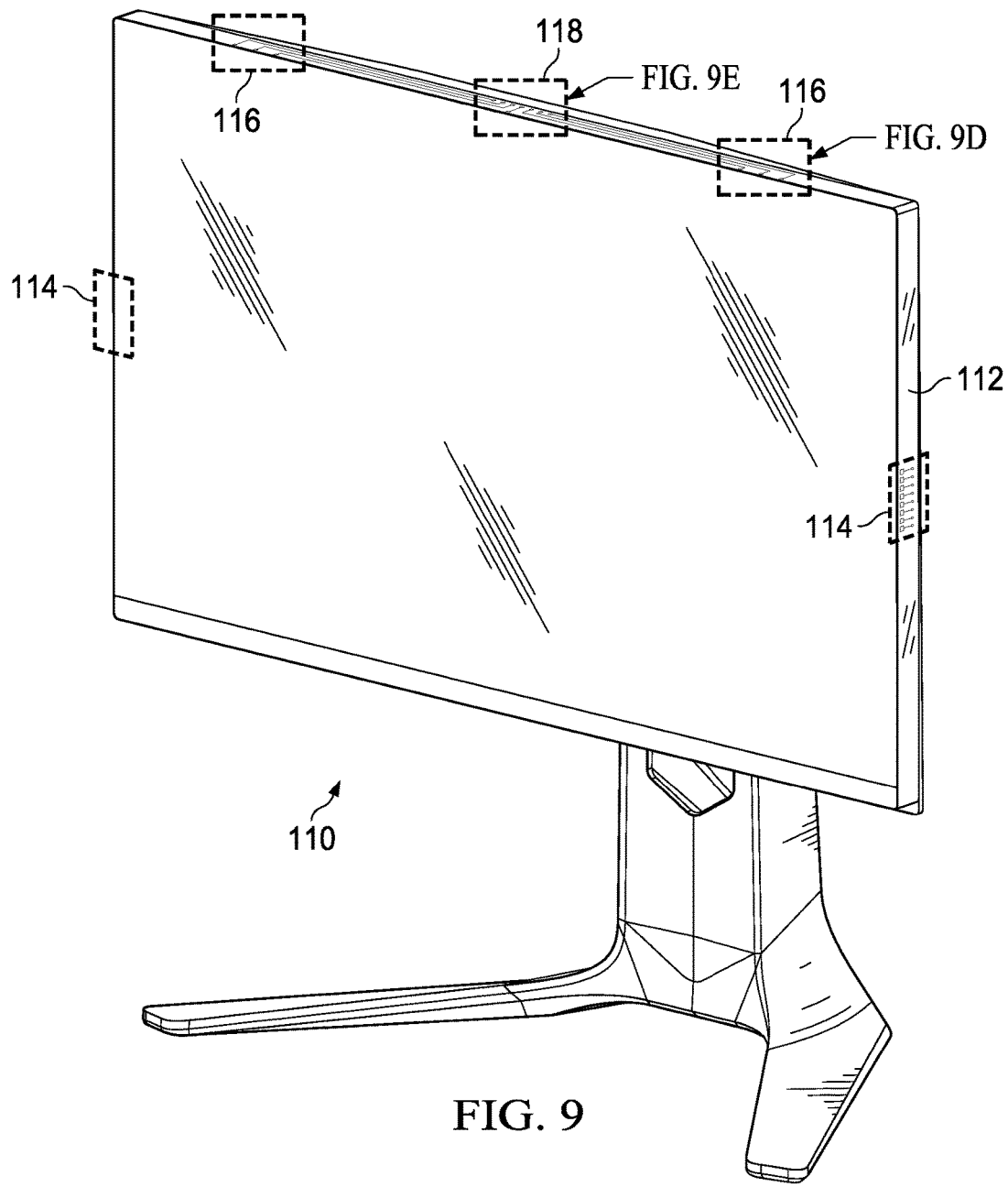
FIGS. 9, 9A, 9B, 9C, 9D and 9E depict an alternative embodiment of an example of a glass ceramic housing of a peripheral display and having integrated antenna and ground wires.

Referring now to FIGS. 9, 9A, 9B, 9C, 9D and 9E, an alternative embodiment depicts an example of a glass ceramic housing of a peripheral display and having integrated antenna and ground wires. FIG. 9 depicts a perspective view of a peripheral display 110 configured to interface with a separate information handling system to present visual images communicated from the information handling system at a display panel. In the example embodiment, a glass ceramic housing 112 couples around the perimeter of the display panel and integrates antenna wires that support wireless communication at the peripheral display. For example, the relatively large housing of a peripheral display and its physical separation from an end user offer an excellent platform for radio communications. An information handling system might, for instance, exchange information with a radio integrated in peripheral display 110 for communication by a WWAN, such as a 5G network. Alternatively, a 60 GHz WPAN might support exchange of display pixel values with a large bandwidth and short range. Glass ceramic housing 112 offers a substantial area not only to share wireless information but also to dispose multiple directional antennas that enhance wireless communication with higher bandwidth, longer range and less interference. In the example embodiment, two side edge antenna sets 114 and two upper edge antenna sets 116 are integrated in glass ceramic housing 112 with a central set of antenna interface wires 118 that support communication to antenna sets 116.

Figure 9A:
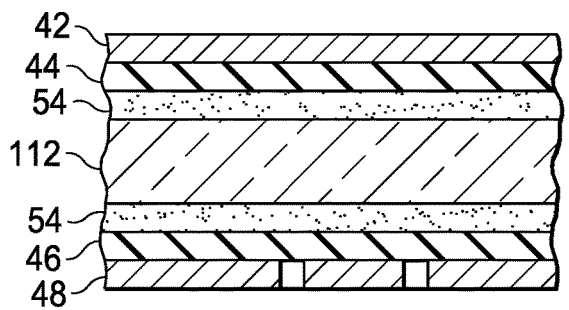
Figure 9B:
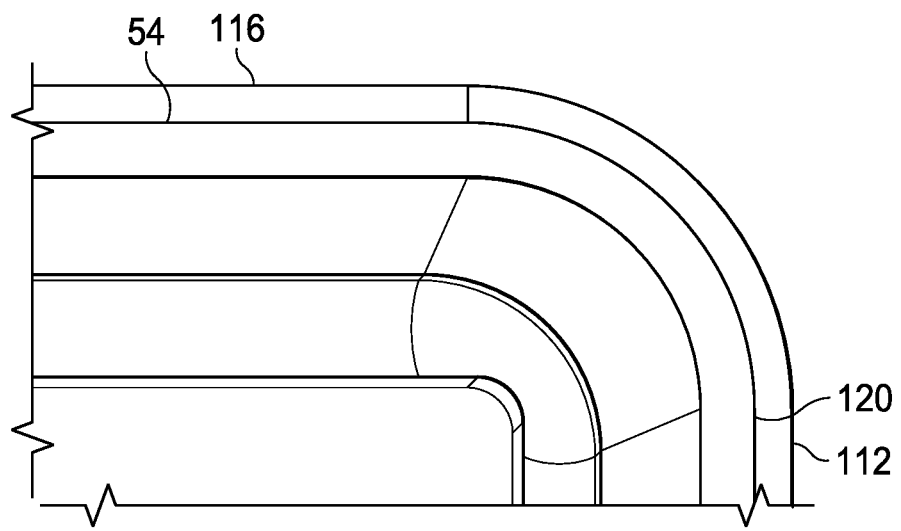
Figure 9C:
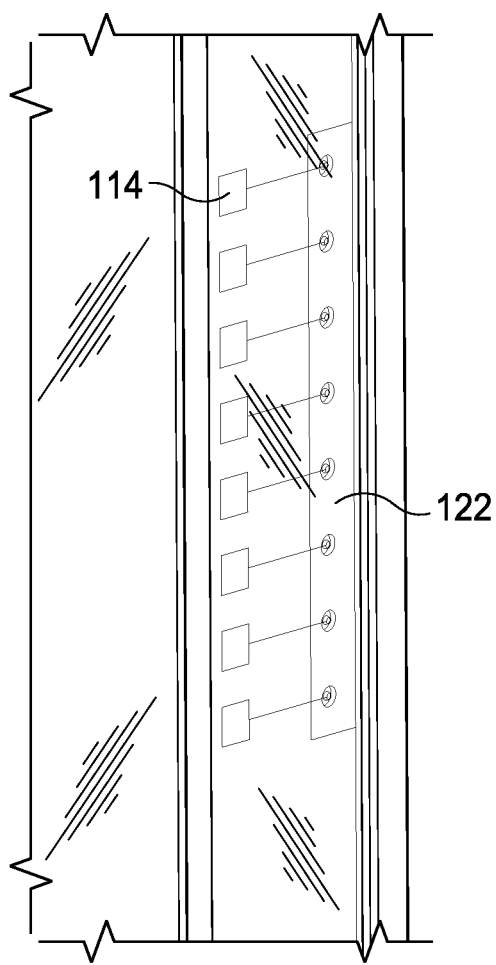
Figure 9D:
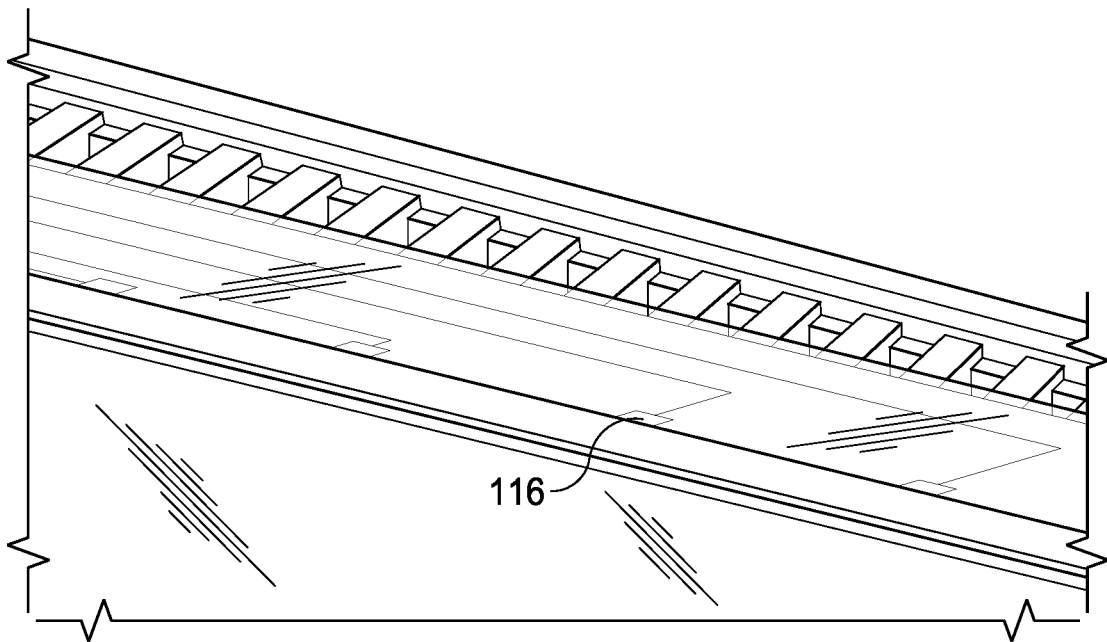
Figure 9E:
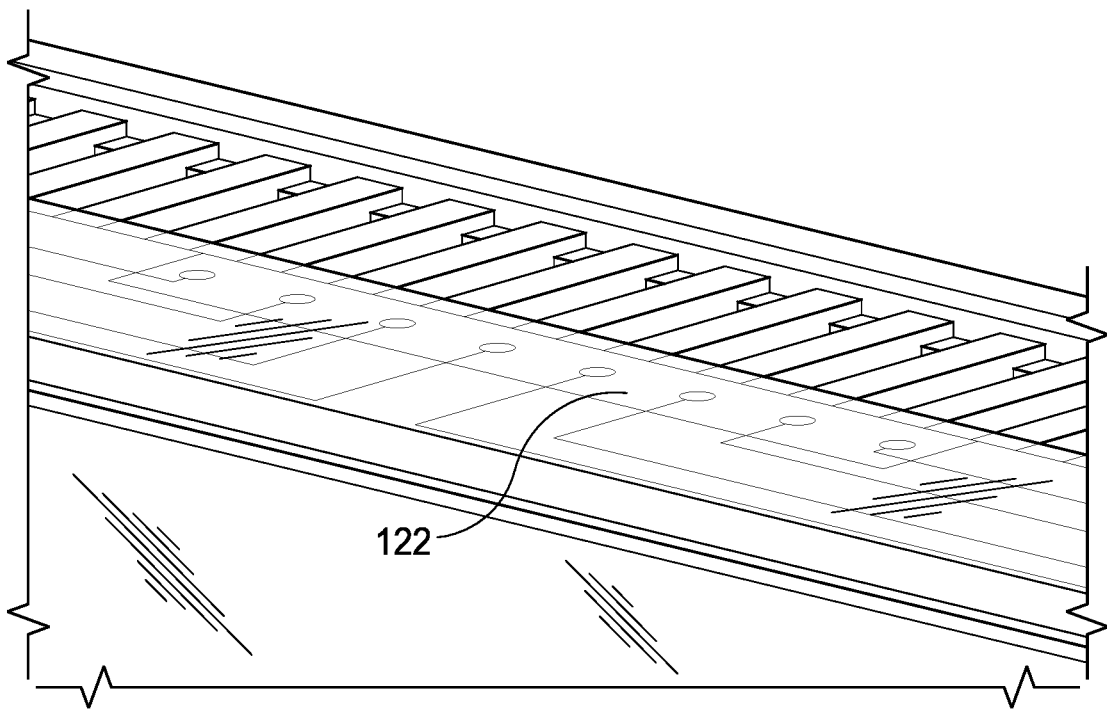

FIG. 9A depicts a side sectional view of the antenna integration in the display glass ceramic housing 112. An antenna ground trace 42, such as a wire trace of a silver alloy, integrates in a transparent ground layer dielectric 44, such as with a lithography process, and couples to glass ceramic housing 112 at an outer surface with an optically clear adhesive 54. A silver alloy antenna trace 148 integrates in a transparent antenna layer dielectric 46, such as with a lithography process, and couples to glass ceramic housing 112 at an inner surface with an optically clear adhesive 54. FIG. 9B depicts a mid-frame 120, such as a molded plastic housing, that couples with glass ceramic housing 112 with a liquid optically clear adhesive 54 so that antenna sets 114 and 116 are exposed through the glass ceramic material at the display 110 periphery. FIG. 9C depicts an isometric view of side antenna set 114, which includes plural diamond mesh grid antennas that each interface with a set of pogo pins extending up against exposed wires of the side antenna set 114 at the glass ceramic housing interior. FIG. 9D depicts an upper perspective view of the upper antenna set 116, also a plurality of diamond mesh antennas, which have interface wires extending from central location of the display. FIG. 9E depicts the central set of antenna interface wires 118 that terminate at a conductive contact where an underlying set of pogo pins provide communication with the display radio.

Figure 10:
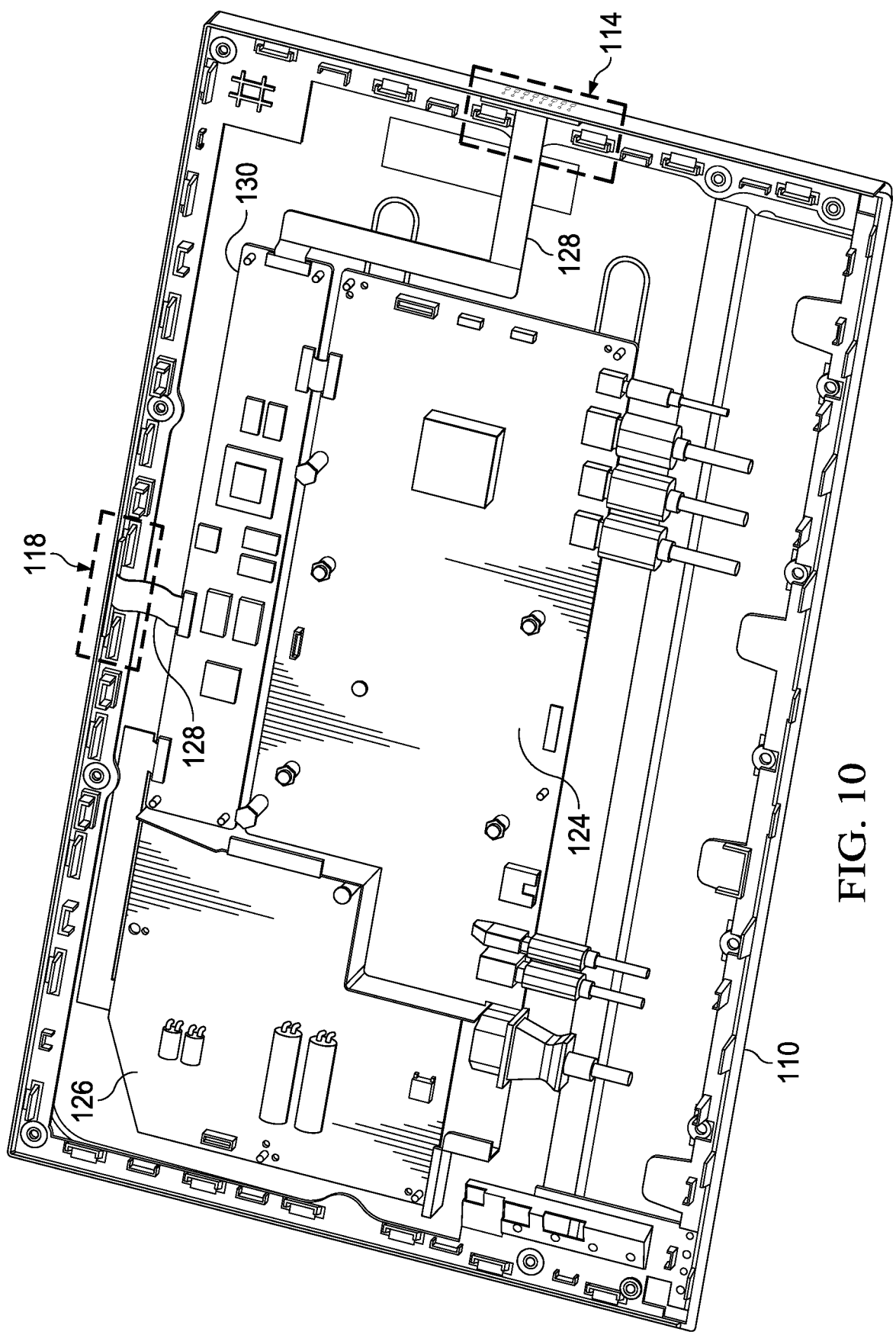
FIGS. 10, 10A, 10B and 10C depict interfaces of the display radio with the glass ceramic antennas.
Figure 10A:
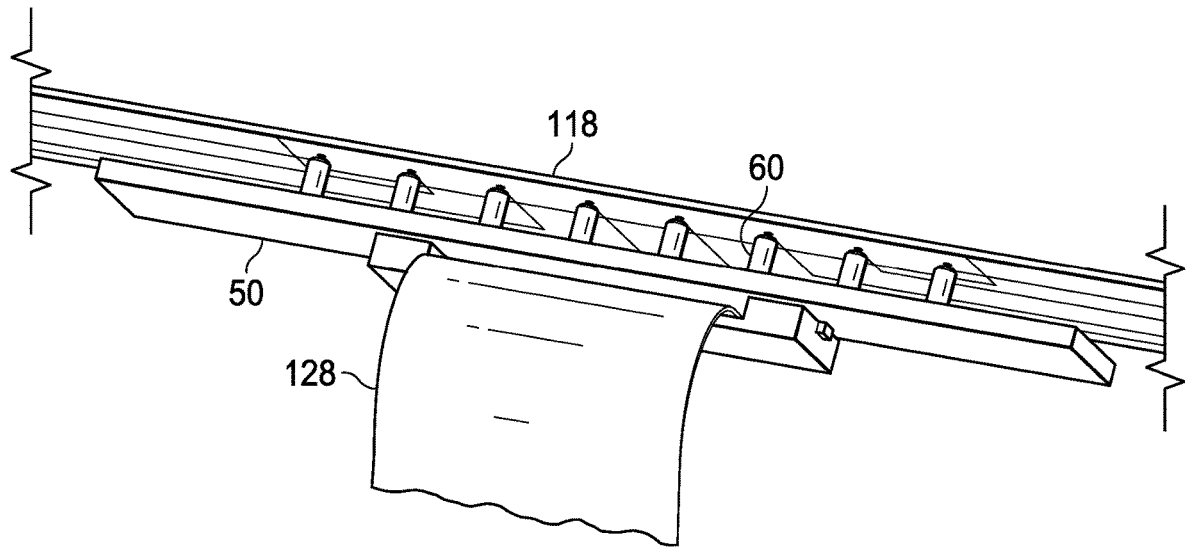
Figure 10B:
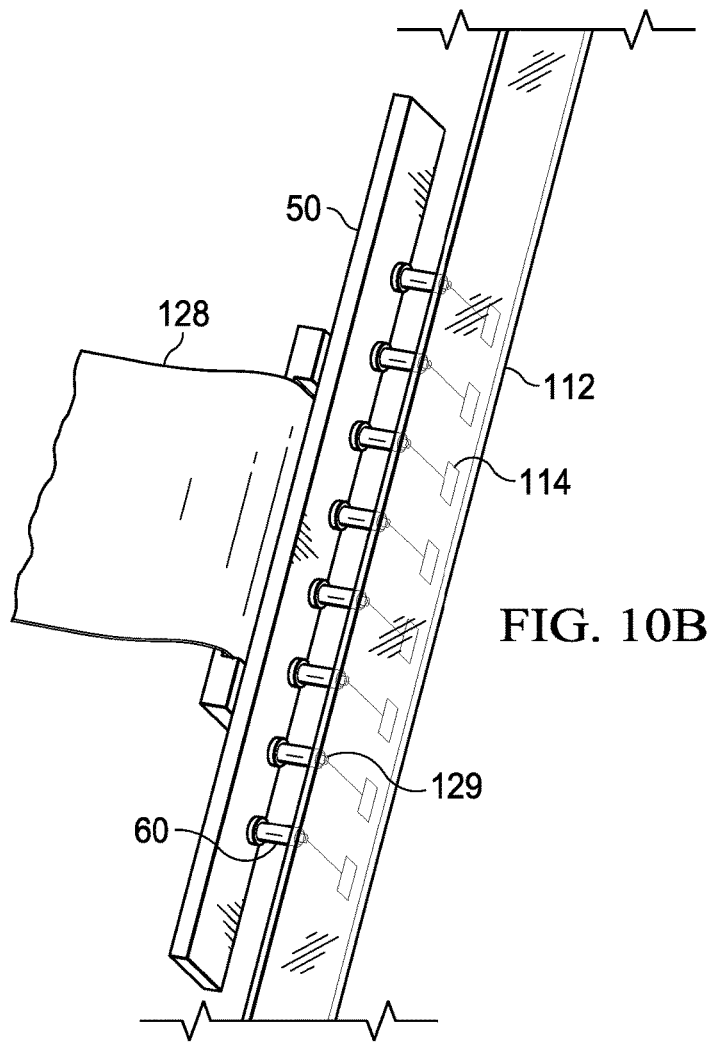
Figure 10C:
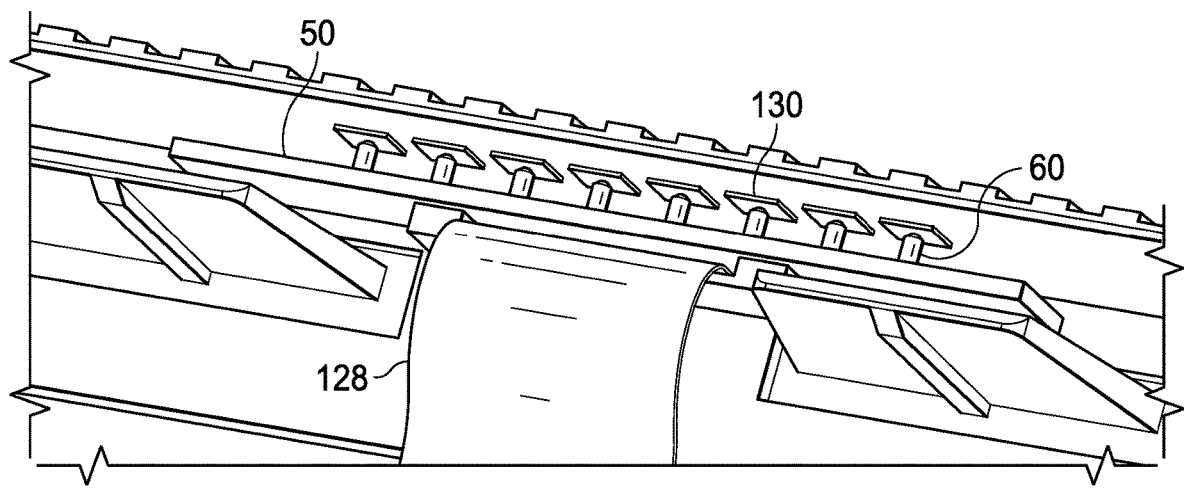

Referring now to FIGS. 10, 10A, 10B and 10C, interfaces of the display radio with the glass ceramic antennas are illustrated. FIG. 10 depicts peripheral display 110 with the display panel removed to expose a scalar board 124 that includes components to manage display operations and present visual images at the display panel. A power board 126 includes components that accept external power, such as from an AC outlet, and convert the power to DC voltage suitable for use by scalar board 124. A femtocell board 130 interfaces with scalar board 124 and power board 126 to accept information and power for establishing communications with one or more radios integrated in femtocell board 130 and external radios. For example, femtocell board 130 has an Ethernet local area network interface provided through scalar board 124 and acts as a wireless bridge between the wired local area network and plural 5G-type external radios that interface through the antenna integrated in the glass ceramic housing 112. Femtocell board 130 supports multiple 5G devices in a limited area, such as within a home or business building where 5G reception of external signals may prove weak. Flexible printed circuits 128 communicate signals between femtocell board 130 and the pogo pin PCBAs that communicate with the integrated antenna, such as for each side set antenna 114 and the central set of antenna interface wires 118. FIG. 10A depicts a PCBA 50 with pogo pins 60 that communicate with flexible circuit 128 and bias up against central set of antenna interface wires 118 to communicate through the upper antenna sets 116. FIG. 10B depicts a PCBA 50 with pogo pins 60 that communicate with flexible circuit 128 and bias against conductive contacts 129 that each interface with one of the side set of antenna 114. Conductive contact 129 may be a slightly enlarged silver alloy wire trace exposed at the interior of glass ceramic housing 112, a pad of other conductive material interfaced with the wire trace, or just the wire trace itself. FIG. 10C illustrates an alternative embodiment having flexible circuit 128 communicating through PCBA 50 and pogo pins 60 directly against a patch antenna 170, such as metal antenna piece of a printed conductive material at the glass ceramic interior, such as a silver alloy, other metal, graphene or other material.

Referring now to FIGS. 11, 11A, 11B, 11C, 11D and 11E, an example embodiment depicts an information handling system base station 70 having a glass ceramic housing cover 132 that integrates antennas 134 and 136. In the example embodiment, antenna 134 is a 60 GHZ half-wave dipole array configured with a director and antenna 136 is a bowtie antenna also configured with a director. For example, as described below in greater detail, the director is a parasitic element free floating relative to the antenna conductor and ground that absorbs and retransmits radiofrequency energy out of phase to provide directional control of the antenna. The example embodiment relates to a docking station embodiment of the base station 70 that supports information handling system operations with power, graphics and network communications; however, alternative embodiments may integrate the antennas 134 and 136 into a glass ceramic housing of an information handling system, display or other device. As depicted, glass ceramic cover 132 forms the upper face of the docking station and couples to a plastic frame 138. In alternative embodiments, the frame may itself be glass ceramic material that forms the housing in entirely or in part. The 60 GHz band provides a high bandwidth with a relatively short range, so placing the antenna in the upper surface of the docking station with directional antennas enhances wireless communication range for information handling systems and peripheral devices located near the docking station. The glass ceramic material manages thermal energy associated with such high bandwidth communications to reduce the impact that thermal energy has on radio antenna performance. Other frequencies that may be supported included 5G WWAN frequencies, WLAN frequencies and WPAN frequencies.

Figure 11A:
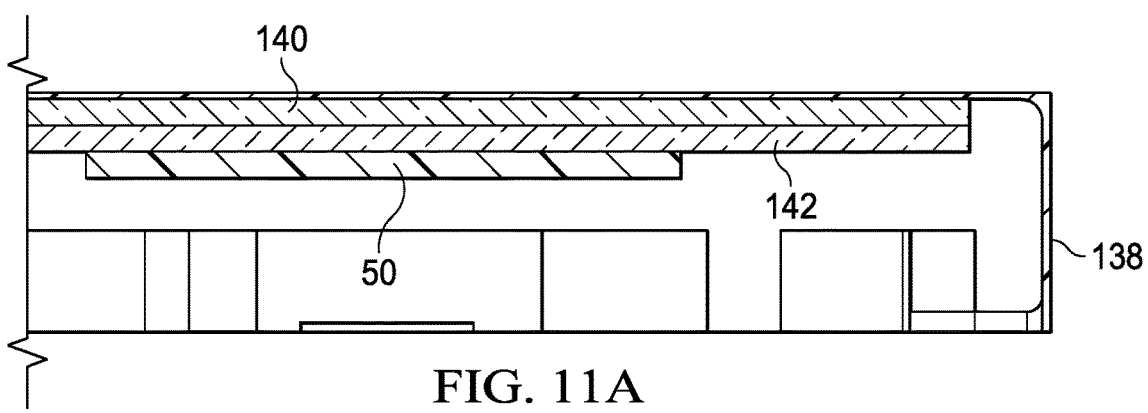
Figure 11B:
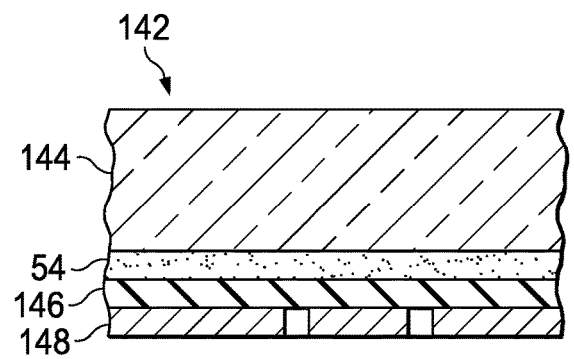
Figure 11C:
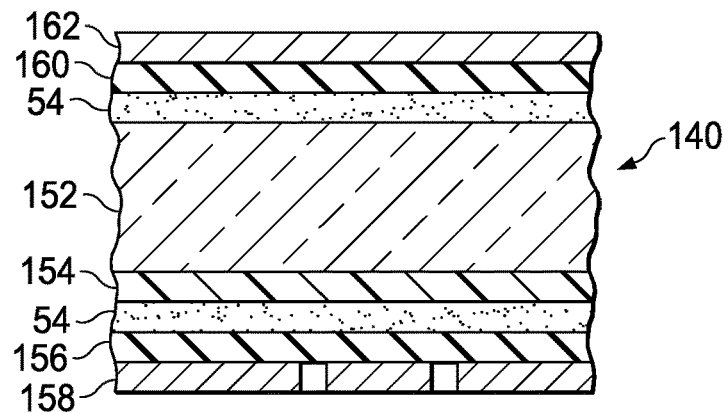

FIG. 11A depicts a side sectional view of glass ceramic housing cover 132 coupled to frame 138 with optically clear adhesive. A director glass ceramic piece 140 exposed at an upper surface couples with an optically clear adhesive to an underlying antenna glass ceramic piece 142. A plastic case 50 couples to the bottom of glass ceramic housing cover 132 to aid in alignment of pogo pins as describe above. At the location of antennas 134 and 136, plastic case 50 provides an air gap to aid in rejection of thermal energy related to transmissions. Coupling director glass ceramic piece 140 over antenna glass ceramic piece 142 provides an additional layer in which all three of antenna, director and ground wires have their own location in vertical space. FIG. 11B depicts a side sectional view of antenna glass ceramic piece 142 having a silver alloy antenna trace 148 integrated with a dielectric 146, such as with lithography, which couples to a glass ceramic material piece 144 with an optically clear adhesive 54. FIG. 11C depicts a side sectional view of director glass ceramic piece 140 having silver alloy wires integrated on both upper and lower sides of a director glass ceramic material piece 152. At a lower surface, silver alloy director traces 158 integrate with a dielectric 156 and couple to director glass ceramic material piece 152 with optically clear adhesive 54. A silk screen layer 154 defines an opaque background appearance and logo to blend the wire traces with the housing cover. At an upper surface of director glass material piece 152, antenna ground traces 162 couple to a dielectric 160 and couple with an optically clear adhesive. To complete the assembly of glass ceramic housing cover 132 director ceramic glass piece 140 couples over antenna glass ceramic piece 142 with optically clear adhesive so that ground wires are in a first layer at the top of glass ceramic housing 132, director wires are in a second middle layer between director glass ceramic piece 152 and antenna glass ceramic material piece 144, and antenna wires are in a third lower layer within the interior of frame 138. The interior position of the antenna wires allows contact of the exposed wire with the radio. The middle position of the director wires provides isolation to support their operation as a parasitic element. The ground wires in the upper layer may interface with ground at the side of frame 138 or with conductive material that extends from the interior to the exterior with conductive material disposed in TGV openings as describe above.

Figure 11D:
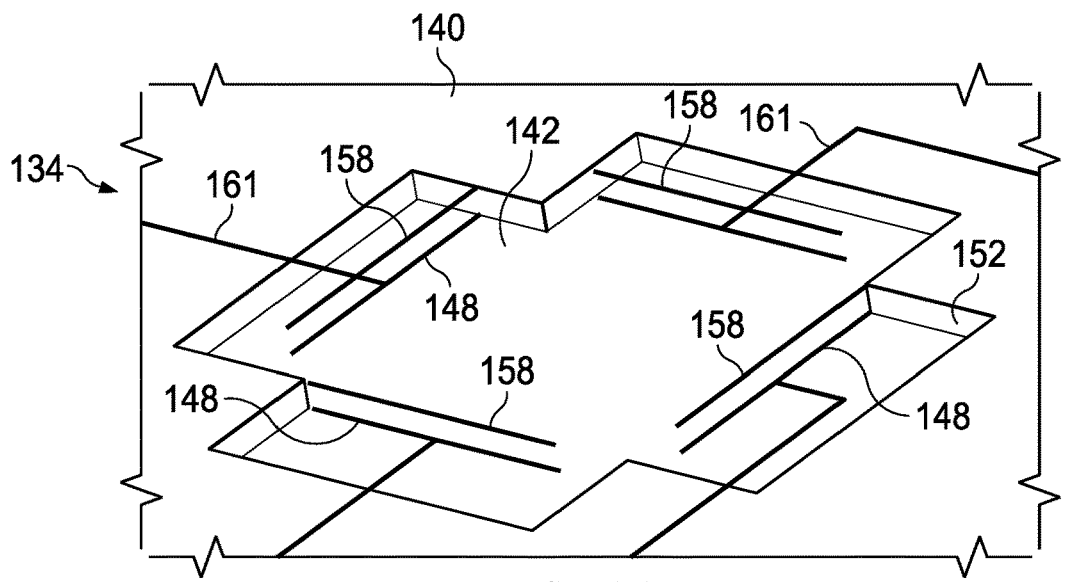
Figure 11E:
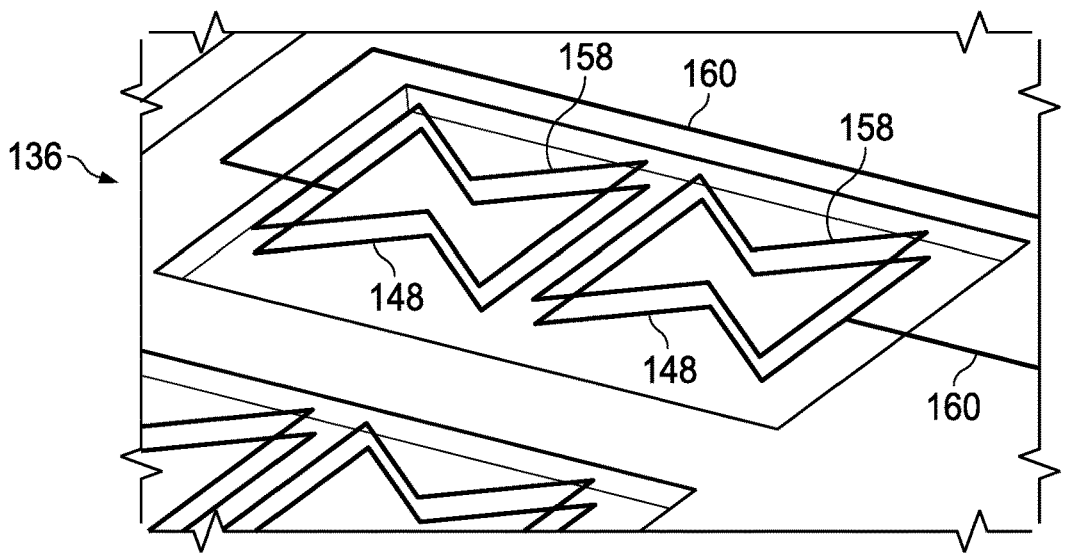

FIGS. 11D and 11E depict an isometric sectional view of an example of wires that define antennas 134 and 136. FIG. 11D depicts a half-wave dipole antenna to show the spatial relationship of antenna and director wires integrated in glass ceramic cover 132. Antenna 134 communicates with the radio through wires 161 that run at the housing interior surface to contact the pogo pins and provide an interface with a conductor wire trace of a dipole antenna also disposed at the housing interior surface. Four antenna traces 148 are disposed in a square pattern with each having an associated director trace 158. Antenna traces 148 integrate in antenna glass ceramic material piece 144 and director traces 158 integrate in director glass ceramic material piece 152, which couples over director glass ceramic material piece 152. The relative positions of antenna and director wires provides a radiation pattern with directed beams in all four directions. FIG. 11E depicts a pair of bowtie antenna 136 having director traces 158 disposed above antenna traces 148, similar to the arrangement of the dipole antenna of FIG. 11D. Director traces provide a parasitic element that directs the antenna radiation pattern.

Figure 12:
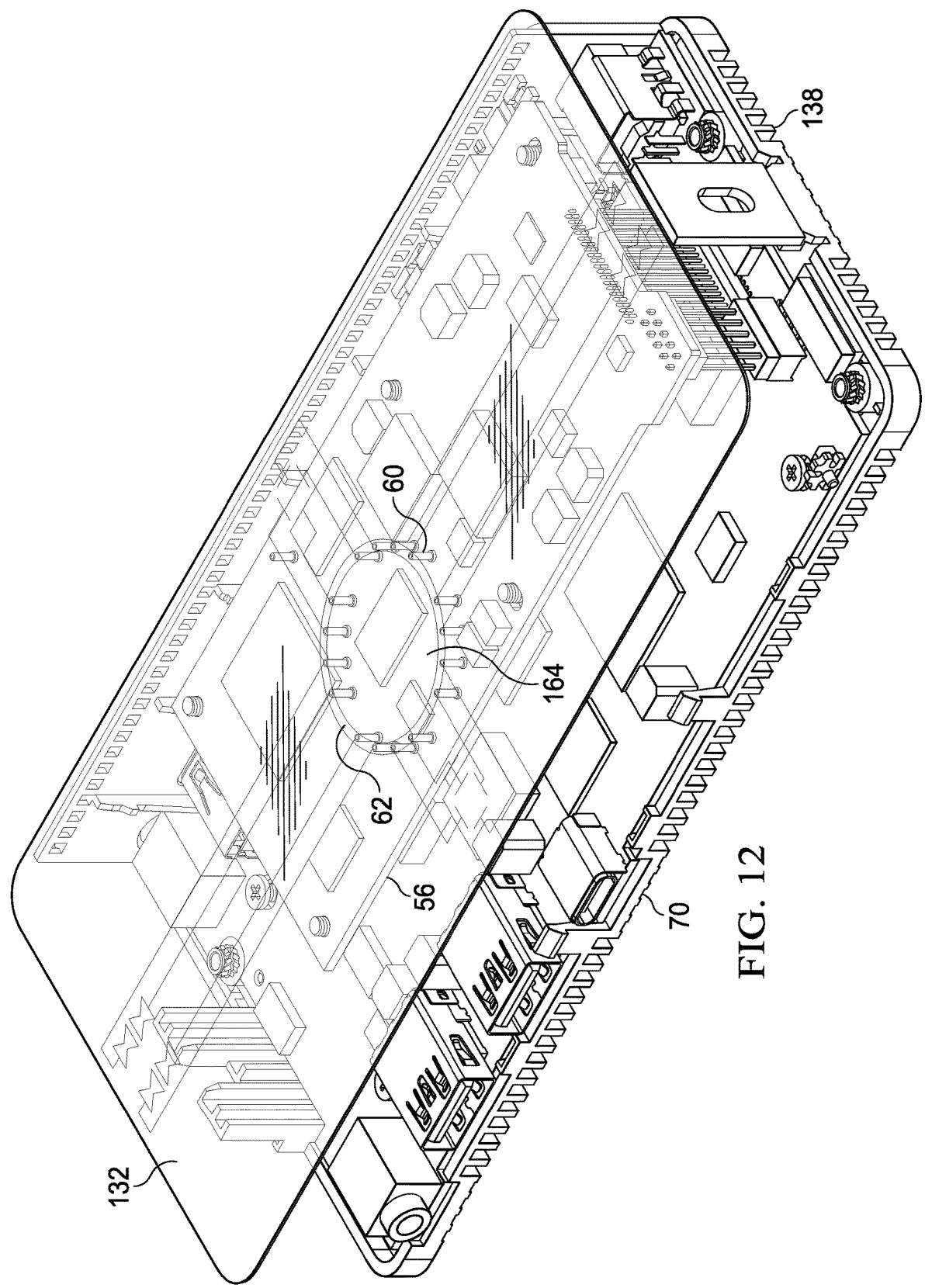
FIG. 12 depicts a perspective view of an information handling system docking station having pogo pins that interface a radio with antennas integrated in the glass ceramic housing lid.

Referring now to FIG. 12, a perspective isometric view depicts an information handling system docking station having pogo pins 60 that interface a radio with antennas integrated in the glass ceramic housing lid 132. In the example embodiment, a PCBA coupled in frame 138 includes components that support operations at a variety of ports to interface with an information handling system, such as power, USB, graphics and other functions. A radio 164 couples to PCBA 56 in a central location under a logo 62 with pogo pins 60 extending up from PCBA 56 to bias against conductive contacts of the antenna traces exposed at the interior surface of glass ceramic housing lid 132. The pogo pins 60 provide communication between radio 164 and antennas integrated in the glass ceramic housing lid 132. Although various embodiments described here in use pogo pins to communicate with antennas, other types of interfaces may be used, whether spring biased or permanently affixed, such as with solder.

Figure 13:
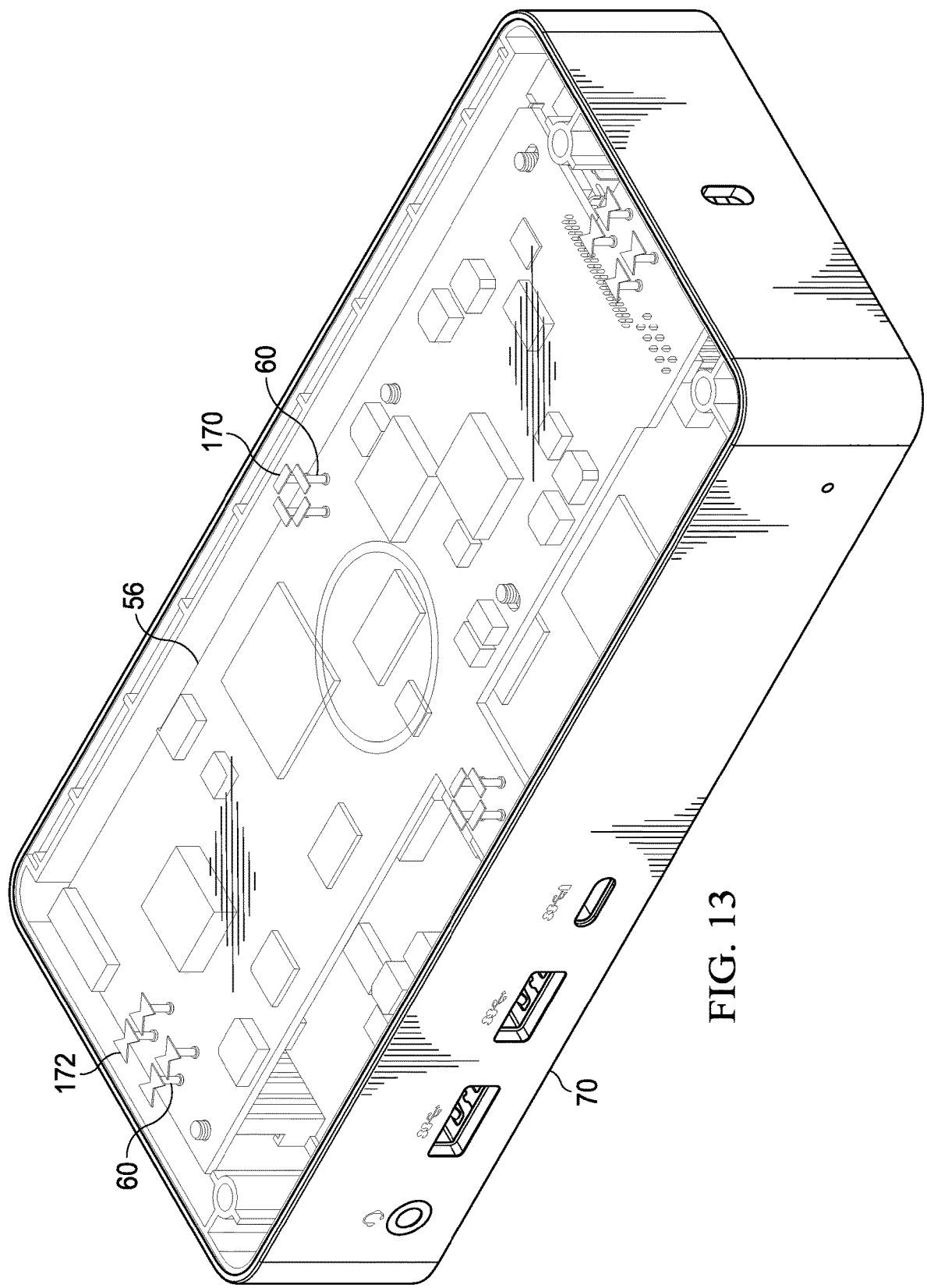
FIGS. 13, 13A and 13B depict an alternative embodiment of the information handling system docking station having printed or stamped antennas at the glass ceramic housing lid.
Figure 13A:
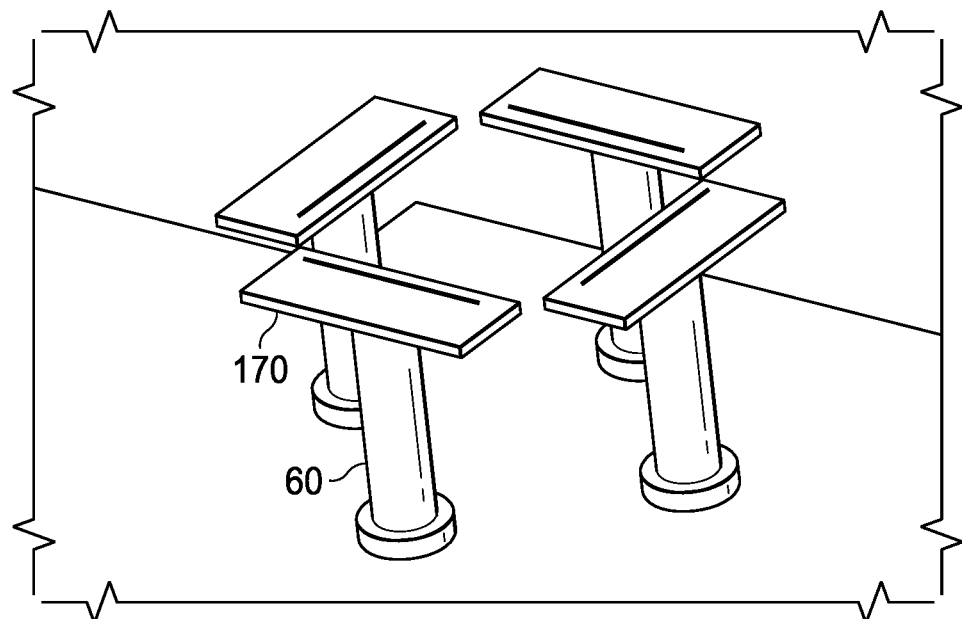
Figure 13B:
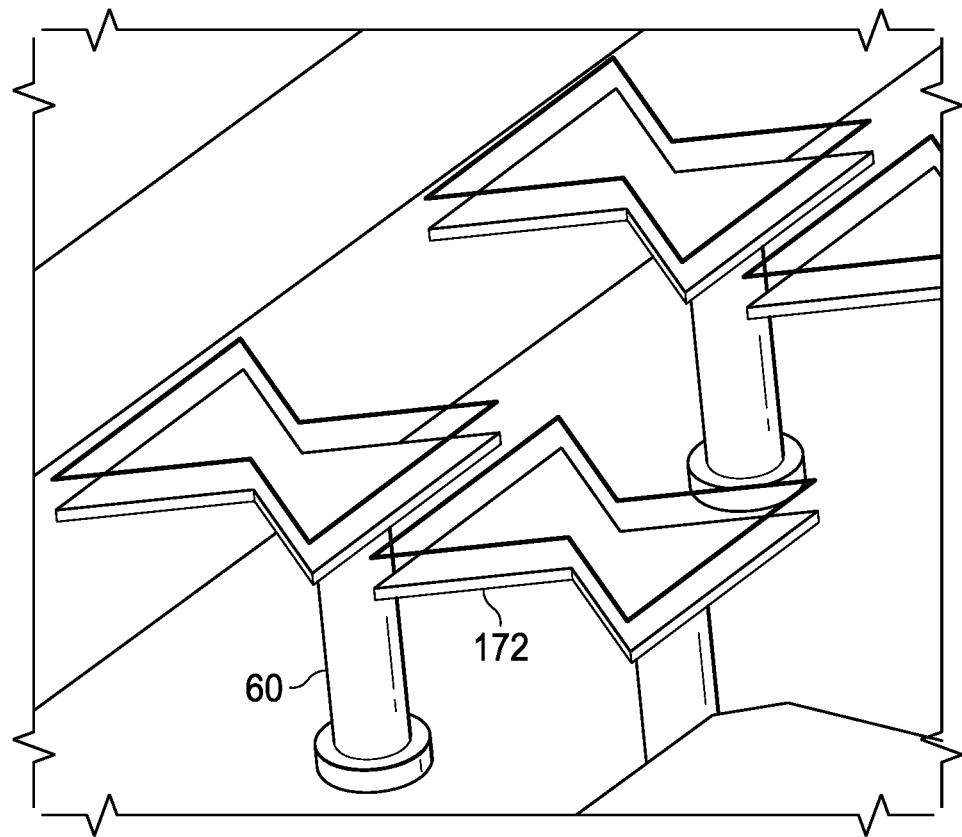

Referring now to FIGS. 13, 13A and 13B, an alternative embodiment depicts the information handling system docking station having printed or stamped antennas at the glass ceramic housing lid. In the example embodiment, PCBA 56 communicates through pogo pins 60 against patch antennas 170 and bowtie antennas 172 that couple to the interior surface of glass ceramic housing lid 132. For example, patch antenna 170 and bowtie antenna 172 may be metal pieces attached to the interior surface or may be traced onto the interior surface. FIG. 13A depicts four patch antenna 170 having directional control of the radiation pattern provided by a director trace integrated glass ceramic lid 132, such as is shown in FIG. 11D. FIG. 13B depicts four bowtie antenna 172 having directional control of the radiation pattern provided by a bowtie director, such as is shown in FIG. 11E.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having an interior and an exterior, the housing comprising a glass ceramic material;
   a processor disposed in the housing and operable to execute instructions to process information;
   a memory disposed in the housing and interfaced with the processor, the memory operable to store the instructions and information;
   a radio disposed in the housing and interfaced with the processor, the radio operable to communicate the information as wireless signals;
   an antenna integrated as conductive material in the glass ceramic material and having one or more conductive contacts exposed at the housing interior and interfaced with the radio to transmit and receive the wireless signals;
   a printed circuit board assembly interfaced with the radio and having plural pogo pins, the printed circuit board assembly coupling to the housing interior to align the plural pogo pins with the one or more conductive contacts of the antenna;

a plastic case coupled to the housing interior and having plural openings aligned with the one or more conductive contacts; and wherein the printed circuit board assembly engages the plastic case to insert the pogo pins through the plural openings and against the one or more conductive contacts.

2. The information handling system of claim 1 wherein the antenna further comprises:
- a first conductive wire disposed proximate the housing interior and having a first conductive contact exposed at the housing interior;
- a second conductive wire disposed proximate the housing exterior; and
- a conductive material integrated in a through glass via opening to interface the second conductive wire with a second conductive contact exposed at the housing interior.

3. The information handling system of claim 2 wherein the first conductive wire comprises a dipole antenna positive trace and the second conductive wire comprise a dipole antenna ground trace.

4. The information handling system of claim 2 wherein the housing glass ceramic material includes an etched logo and the first and second conductive contacts are located at the etched logo.

5. The information handling system of claim 1 wherein the antenna conductive material comprises a conductive wire terminating as a patch defined by a diamond grid of the conductive wire.

6. The information handling system of claim 5 wherein the antenna conductive wire includes plural patches defined by the diamond grid of conductive wire and interfaced with the radio to support directional transmission of radio signals.

7. An information handling system comprising:
- a housing having an interior and an exterior, the housing comprising a glass ceramic material;
- a processor disposed in the housing and operable to execute instructions to process information;
- a memory disposed in the housing and interfaced with the processor, the memory operable to store the instructions and information;
- a radio disposed in the housing and interfaced with the processor, the radio operable to communicate the information as wireless signals;
- an antenna integrated as conductive material in the glass ceramic material and having one or more conductive contacts exposed at the housing interior and interfaced with the radio to transmit and receive the wireless signals;
- a printed circuit board assembly having plural pogo pins aligned to contact against the plural patches;
- a flexible cable interfacing the printed circuit board assembly and the radio; and
- wherein the glass ceramic material defines a curved surface for at least a portion of the perimeter of the housing and the antenna conductive material comprises plural patches integrated at the curved surface.

8. An information handling system comprising:
- a processor operable to execute instructions that process information;
- a memory interfaced with the processor and operable to store the instructions and information;
- a radio interfaced with the processor and operable to communicate the information as wireless signals; and
- a housing containing the processor, the memory and the radio, the housing comprising:
- a planar glass ceramic having an interior side and an exterior side;
- a first conductive wire integrated in a first side of the planar glass ceramic;
- a second conductive wire integrated in a second side of the planar glass ceramic opposite the first side;
- conductive material disposed in a through glass via opening to interface the second conductive wire with the first side; and
- conductive contacts exposed at the planar glass ceramic first side configured to interface the first and second conductive wires with the radio as a dipole antenna.

9. The information handling system of claim 8 wherein the first and second conductive wires terminate as diamond mesh grid.

10. The information handling system of claim 8 wherein the first and second conductive wires comprise a silver alloy.

11. The information handling system of claim 8 having a product logo included in the glass housing, the conductive contacts co-located with the product logo.

* * * * *